US007890120B2

(12) United States Patent
Povey et al.

(10) Patent No.: US 7,890,120 B2
(45) Date of Patent: Feb. 15, 2011

(54) METHOD OF LOCATING A CELLULAR TERMINAL

(75) Inventors: Gordon Povey, Fife (GB); Ian Band, Edinburgh (GB)

(73) Assignee: Artilium UK Ltd, Dunfermline (GB)

( * ) Notice: Subject to any disclaimer, the term of this patent is extended or adjusted under 35 U.S.C. 154(b) by 843 days.

(21) Appl. No.: 11/579,214

(22) PCT Filed: Apr. 29, 2005

(86) PCT No.: PCT/GB2005/001656

§ 371 (c)(1),
(2), (4) Date: Jul. 25, 2007

(87) PCT Pub. No.: WO2005/107309

PCT Pub. Date: Nov. 10, 2005

(65) Prior Publication Data

US 2007/0281712 A1    Dec. 6, 2007

(30) Foreign Application Priority Data

Apr. 30, 2004    (GB) ................................ 0409630.1

(51) Int. Cl.
*H04W 24/00* (2009.01)
(52) U.S. Cl. ..................................... 455/456.1; 455/440
(58) Field of Classification Search ................... 455/440
See application file for complete search history.

(56) References Cited

U.S. PATENT DOCUMENTS

| | | | | |
|---|---|---|---|---|
| 5,881,368 | A * | 3/1999 | Grob et al. ..................... 455/69 |
| 5,898,682 | A * | 4/1999 | Kanai .......................... 370/331 |
| 6,026,304 | A * | 2/2000 | Hilsenrath et al. ....... 455/456.2 |
| 6,144,861 | A * | 11/2000 | Sundelin et al. ............. 455/522 |
| 6,475,870 | B1 * | 11/2002 | Huang et al. ................. 438/316 |
| 6,631,263 | B1 * | 10/2003 | Corkery ....................... 455/436 |
| 6,889,054 | B2 * | 5/2005 | Himmel et al. .......... 455/456.3 |
| 7,239,619 | B2 * | 7/2007 | Tobe et al. ................... 370/331 |
| 2003/0096620 | A1 * | 5/2003 | Ozturk et al. ............... 455/456 |
| 2003/0100317 | A1 * | 5/2003 | Kaplan et al. ............... 455/456 |

OTHER PUBLICATIONS

Kim and Stuberi. CDMA Soft Handoff Analysis in the Preseence of Power Control Error and Shadowing Correlation. IEEE Transactions on Wireless Communications, vol. 1, No. 2 Apr. 2002, [online], [retrieved on Dec. 28, 2009]. Retrieved from the Internet <URL: http://www.comsoc.org/twc/private/2002/apr/pdf/01wc02-kim.pdf>.*
International Search Report for corresponding PCT/GB2005/001656, completed Aug. 30, 2005.

* cited by examiner

*Primary Examiner*—Charles N Appiah
*Assistant Examiner*—Stamford Hwang

(57) ABSTRACT

A method of locating and tracking a cellular terminal (1) is described. The method comprises the detection of one or more handover events that take place when the cellular terminal (1) moves between transmission regions (3) of a cellular terminal network provider. Information regarding the handover events is recorded within a database (4) so that the location of the cellular terminal (1) can be calculated. The calculation of the location of the cellular terminal (1) is achieved by either comparing the information with previously stored data or by extracting information regarding the location and geometry of the individual transmissions regions (3) such that a handover region (9) can be calculated. The precise location and area of the handover regions (9) takes account of various factors including power, time of flight of the transmitted signals and timing synchronization within transmission regions (3) and the effects of shadowing of the transmitted signals.

15 Claims, 20 Drawing Sheets

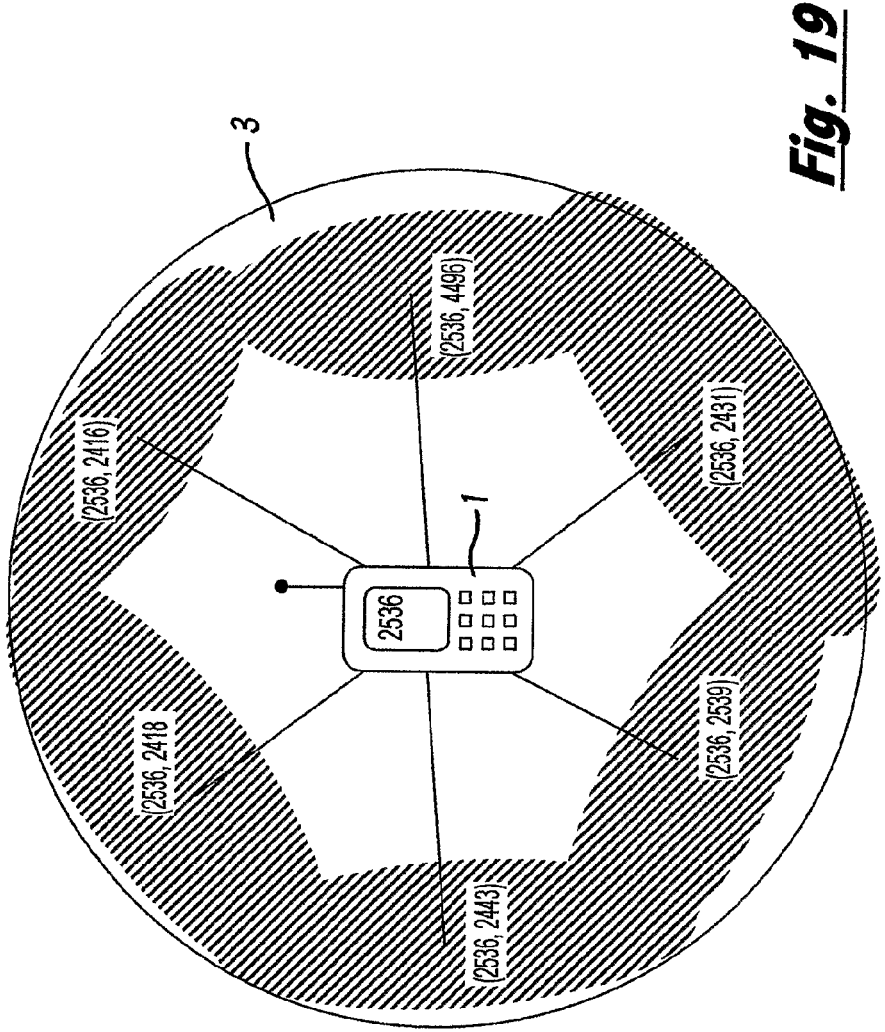
Locating a terminal using handover regions when no handover has occurred - P
*Fig. 19*

METHOD OF LOCATING A CELLULAR TERMINAL

This invention relates to a method of locating a cellular terminal and in particular to a method of locating a cellular terminal that employs the standard communication process between the cellular terminal and associated communication network transmitters.

Conventional methods of locating a cellular terminal 1 known to those skilled in the art employ so called "cell of origin" techniques, presented schematically in FIG. 1. In particular FIG. 1 depicts two base stations 2 each with an associated cell 3 that represents the range of transmission of the particular base station 2. The geographical position of the base stations is recorded within the network server.

Normal practice is for the cellular terminal 1 to "camp" or couple with one particular base station 2, this typically being the base station 2 with the strongest signal, which is normally the base station 2 located closest to the cellular terminal 1. The location of the centre of that cell 3 is then assumed to be the approximate location of the cellular terminal 1. As the cellular terminal 1 moves between cells 3 the approximated location of the terminal 1 moves from being the middle of the first cell to being the middle of the second cell, as determined by the network server.

The accuracy of this technique is limited since it is largely dependent on the size of the cells 3 and so can generally only be approximated to within the cell radius. Furthermore, when employing the "cell of origin" methods there is often a latency experienced in the location information since it is normally sourced from the cellular network operator. The operator may provide only the last known cell location that in practice could be many minutes old. This latency reduces the accuracy and hence the value of the position information.

An alternative method known to those skilled in the art for locating a cellular terminal 1 are satellite-based global positioning systems (GPS). GPS solutions are generally more accurate than "cell of origin" methods but are significantly more expensive and have restricted use when required to operate indoors.

A further alternative prior art method involves the use of a triangulation method. This method employs the technique of recording signal of arrival measurements (e.g. time, power and angle from or to multiple base stations) and is known to be reasonably accurate. However, triangulation methods require additional equipment, processing and communications within the network side or require measurements to be made using modified or specialised terminal equipment.

It is therefore an object of the present invention to provide a method of locating a cellular terminal that overcomes one or more of the aforementioned problems by providing a relatively simple, low-cost and accurate cellular terminal location system.

SUMMARY OF INVENTION

According to a first aspect of the present invention there is provided a method of locating a cellular terminal comprising the steps of:
1) Detecting a handover event of the cellular terminal from a first network signal transmission region to a second network signal transmission region;
2) Extracting from a database a location of the handover event.

In the present invention the database may be hosted by a remote server, by the cellular terminal itself or spread between a remote server and the cellular terminal. In practice the remote server can be hosted by a third party or by the network provider themselves.

Preferably the cellular terminal detects the handover event and transmits one or more network signal transmission region identifiers to the database so as to allow for the identification of the first and second network signal transmission regions.

Alternatively, the cellular terminal periodically transmits network signal transmission region identifier information to the database so that the database determines directly when the handover event occurs.

Most preferably the method of locating a cellular terminal further comprises the step of recording a time at which the handover event occurs.

Optionally the time at which the handover event occurs is forwarded by the cellular terminal to the database. Alternatively, when the database determines directly that the handover event has occurred the time is recorded by the database.

Preferably the database records the time of two or more handover events of the cellular terminal so as to produce a time series of location data for the two or more handover events.

Optionally the step of extracting from the database the location of the handover event comprises the extraction of a predetermined location for the handover event of a cellular terminal moving from the first identified region to the second identified region.

Alternatively the step comprises the extraction of a predetermined location for the handover event of a cellular terminal moving from the second identified region to the first identified region.

Preferably the step of extracting from the database the location of the handover event comprises the extraction of information relating to a location and geometry of the first and second identified regions.

Optionally the extraction of information relating to the location or geometry of the first and second identified regions comprises the transmission of a direct request from the database to a network provider for information corresponding to at least one of the identified regions.

Most preferably the information relating to the location and geometry of the first and second identified regions is employed:
1. to calculate a handover region between the first and second identified regions;
2. calculate the centre of the handover region so as to provide an estimate of the location of the handover event.

Preferably the step of calculating the handover region comprises calculating the area of overlap between the first and second identified regions.

Optionally the position of the handover region is translated relative to the position of the area of overlap between the first and second identified regions by an amount dependent on the power of the transmitted signals within the first and second identified regions.

Optionally the position of the handover region is translated relative to the position of the area of overlap between the first and second identified regions by an amount dependent on a time of flight calculation of the transmitted signals within the first and second identified regions.

Optionally the area of the handover region is expanded so as to compensate for the effects of shadowing within the first and second identified regions.

Preferably the amount by which the handover region is expanded is calculated by comparing the signal power before and after the handover event with those obtained in connection with earlier handover events recorded on the database between the first and second identified regions.

Preferably the method of locating the cellular terminal further comprises the step of monitoring the power of the transmitted signals within the first and second identified regions so as to ascertain any direction of movement associated with the cellular terminal.

Preferably the method of locating the cellular terminal further comprises the step of monitoring the time of flight calculations of the transmitted signals within the first and second identified regions so as to ascertain any direction of movement associated with the cellular terminal.

Preferably the database records the location of one or more handover events associated with the cellular terminal.

Optionally the recordal of the location of the one or more handover events allows the data base to monitor real time movement of the cellular terminal.

Optionally the recordal of the location of the one or more handover events allows the database to calculate higher order handover events so as to further increase the accuracy of the method of locating the cellular terminal.

Preferably an estimate of a velocity of a cellular terminal can be calculated from measuring the time difference between two or more handover events.

Optionally the accuracy of the estimate of the location of the cellular terminal can be increased by employing knowledge of one or more handover events stored within the database between the first or second identified regions and a third identified region.

Optionally the accuracy of the estimate of the location of the cellular terminal can be increased by employing knowledge of the local geography stored within the database. For example, the knowledge of local transport routes can be employed to increase the accuracy of a cellular terminal recorded as travelling with a velocity greater that a typical walking speed of a cellular terminal user.

Preferably the database records routes travelled by the cellular terminal so allowing predictive movement of the cellular terminal to be carried out.

According to a second aspect of the present invention there is provided a method of collating data of network signal transmission regions of at least one cellular communications network, the method comprising the steps of:
1) Providing a cellular terminal;
2) Requesting from a location service provider, cellular terminal location information corresponding to the location of the terminal;
3) Receiving, from a network signal transmission region of a cellular communications network, the cellular terminal location information into the mobile terminal;
4) Forwarding, to a server; the cellular terminal location information along with network signal transmission region identifier information;
5) Computing a location of the identified network signal transmission region from the cellular terminal location information, and;
6) Storing, in a database maintained by said server, the computed location of the identified network signal transmission region.

Preferably, the request for cellular terminal location information is made to a communications network server. Alternatively, the request for cellular terminal location information is made using a GPS device.

Preferably, step 2) is carried out in response to a cellular terminal handover event between a first network signal transmission region and a second network signal transmission region. More preferably, step 4) provides network signal transmission region identifier information for the first and second network signal transmission regions.

Optionally step 4 comprises forwarding the information to a remote server. Alternatively, step 4 comprises forwarding the information to a server located within the cellular terminal.

According to a third aspect of the present invention there is provided a method of providing a cellular terminal user with location-related information comprising the steps of:
1) Locating a cellular terminal in accordance with the method of the first aspect of the present invention, and;
2) Transmitting user specific information from a database relating to the location of the cellular terminal.

Preferably, the user specific information transmitted is determined by the provider of the database in relation to topics pre-supplied to the provider by the user of the cellular terminal.

Alternatively, the user specific information transmitted is determined in response to specific requests made by the user of the cellular terminal to the provider of the data base.

Preferably, the database comprises a database collated by the method described in accordance with the second aspect of the present invention.

BRIEF DESCRIPTION OF DRAWINGS

Aspects and advantages of the present invention will become apparent upon reading the following detailed description and upon reference to the following drawings in which:

FIG. 19 presents a schematic representation of an alternative method of locating a cellular terminal based on a database of handover regions.

Figure 1:
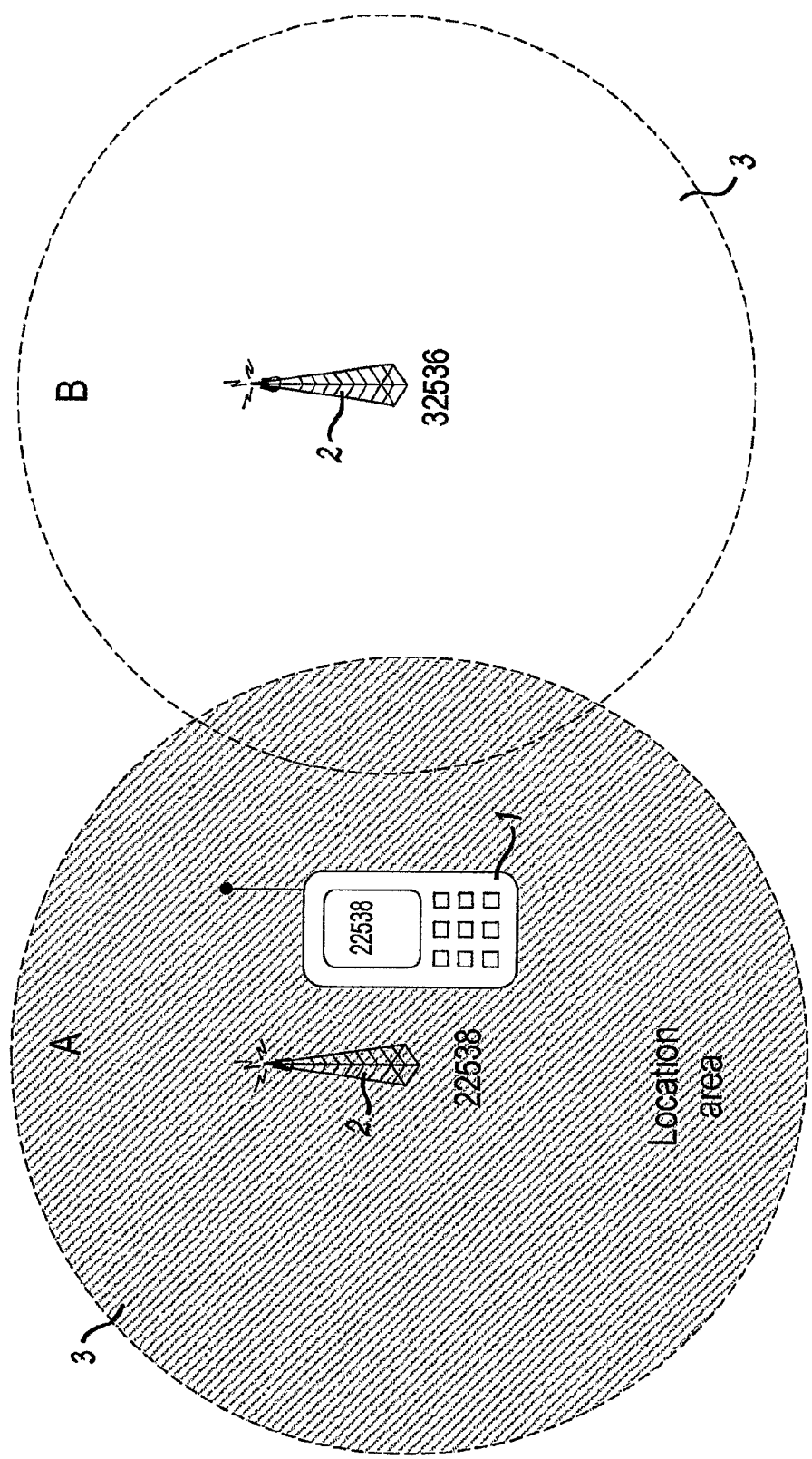
FIG. 1 presents a schematic representation of the "cell of origin" techniques employed within the prior art for locating cellular terminals.
Figure 2:
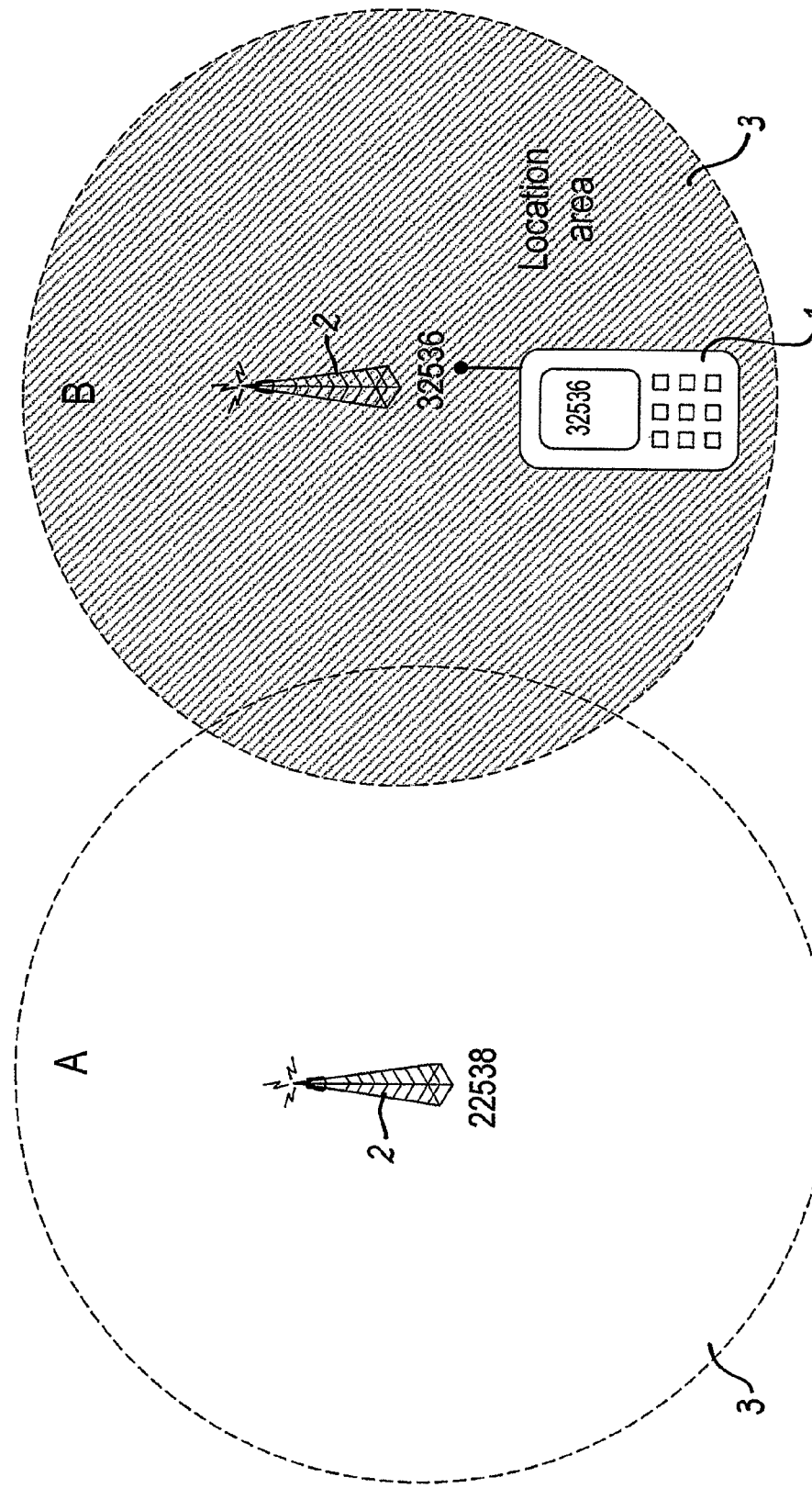
FIG. 2 presents a second schematic representation of the "cell of origin" techniques employed within the prior art for locating cellular terminals.

For consistency and clarity purposes the various features of the described method of locating a cellular terminal are referred to by the same reference numerals throughout the specification. Where appropriate, those reference numerals employed to describe the methods known within the prior art are also maintained within the specific description of the present method.

DETAILED DESCRIPTION

A first embodiment of a method of locating a cellular terminal 1, in accordance with an aspect of the present invention, involves the execution of a software application within the cellular terminal 1 that allows the cellular terminal 1 to communicate with a central database 4 stored on a server 5.

Figure 3:
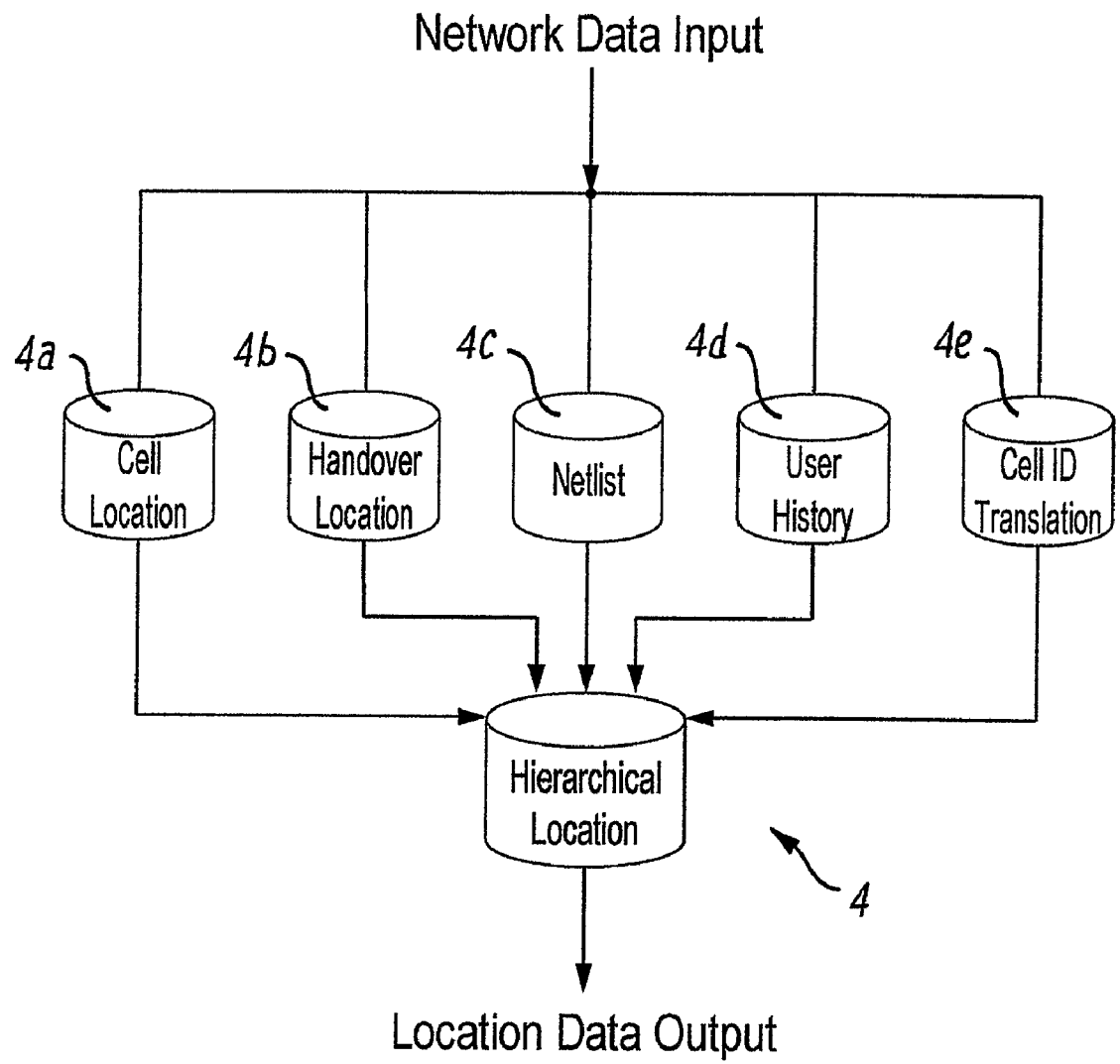
FIG. 3 presents a schematic representation of a database employed within the present invention.

From the schematic representation of FIG. 3 it can be seen that in practice the central database 4 comprises five separate databases 4a-e, namely:
1. A cell location database 4a that holds a record of cell IDs against physical location for the centre of that cell coverage. This information is used to calculate data for inclusion in the handover database;
2. A handover database 4b that is the main database used to provide location data. This database holds data for cell handover pairs (or triples or quads) and files physical locations against these;
3. A netlist database 4c that provides a record of how cells 3 are connected to each other, as defined by observed handovers;
4. A user history database 4d that is used to hold historical location data for each cellular terminal 1. This is simply a log of the data sent by each cellular terminal 1; and
5. A cell ID translation database 4e that is essentially a look-up table that is able to translate between cell IDs used by the network operators and those IDs used internally within the methods describe herein.

In practice a separate database 4 will normally be required for each network provider. However, it will be readily apparent to those skilled in the art that all the data could be combined within a single database.

The software application is employed to access information contained within the cellular terminal 1 and is specifically designed to be initiated when the cellular terminal 1 is powered up and thereafter operate as a background task. For example the software application can be employed to read the following information from the cellular terminal 1:
i) the network provider name;
ii) the cell of origin ID;
iii) the location area code;
iv) the signal strength and timing or synchronisation offset;
v) the time and date;
vi) the device or SIM identification number; and
vii) the terminal device type and operating system (OS) version.

The network provider name (i) is used to identify that the user will be transmitting cell information relating to a particular operators network 7. The cell ID and area code (ii & iii) are required so as to allow the cellular terminal 1 to identify the current cell 3 or sector 6 within which it is located. The signal strength, timing or synchnonisation offset (iv) can be used to enhance the accuracy of the location estimate, as described in further detail below. The time (v) is used to provide the exact time when the information was measured relative to the terminals internal clock. The device or SIM identification (vi) is required to determine which particular cellular terminal 1 has transmitted the information while the device and OS type (vii) is provided in order to solve any compatibility issues that may arise. The above information is transmitted to the server 5 so as to be recorded within the database 4, as appropriate.

Figure 4:
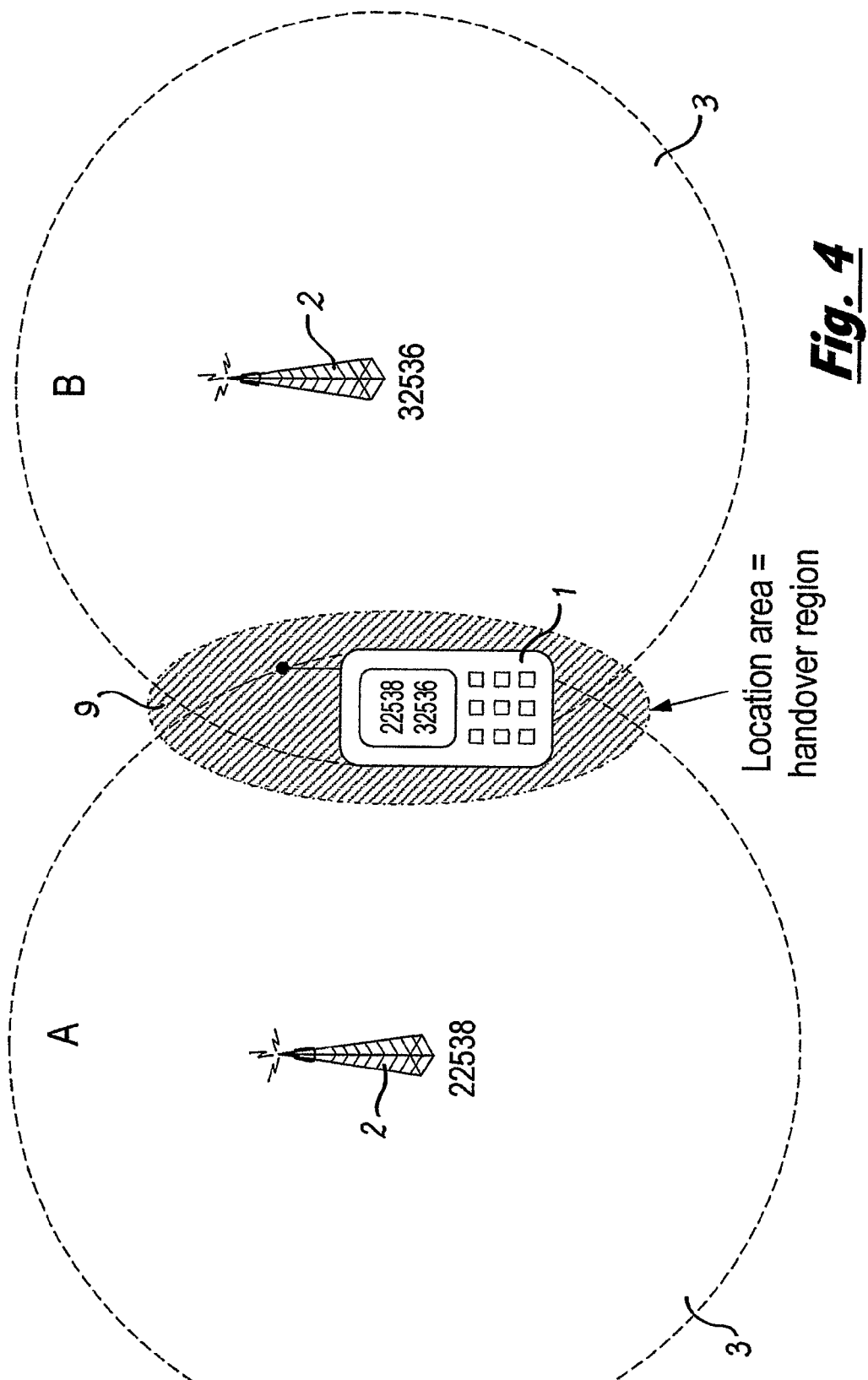
FIG. 4 presents a schematic representation of a handover of a cellular terminal between two cells within a network in accordance with an aspect of the present invention.
Figure 5:
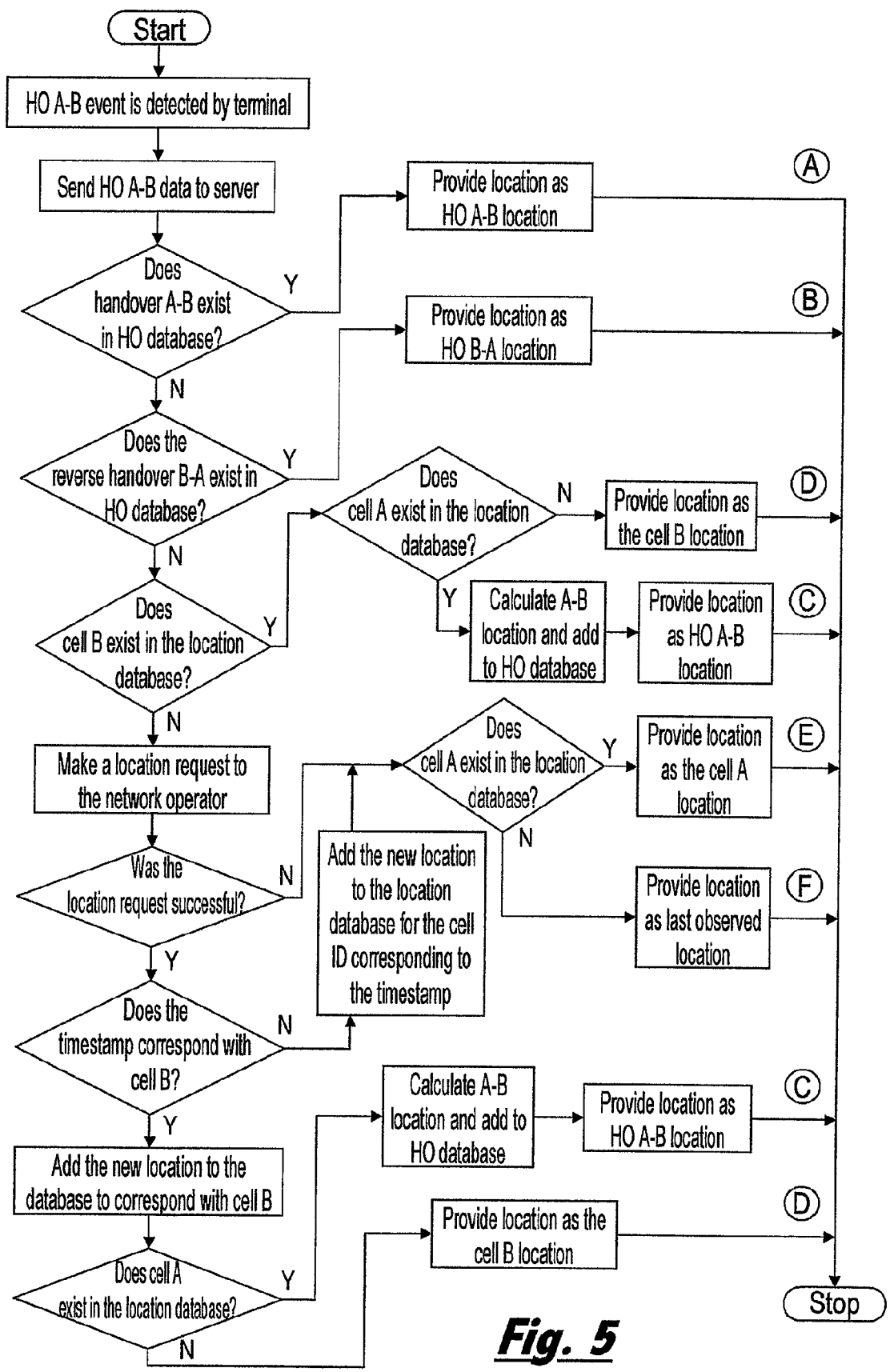
FIG. 5 presents a flow diagram of the methodology employed with the handover event of FIG. 4.

Initially a "cell of origin" step is employed to identify the approximate location of the cellular terminal 1. FIG. 4 presents a schematic representation of the movement of the cellular terminal 1 within the network and in particular the occurrence of a handover between two cells 3 while FIG. 5 presents a flow diagram for the methodology employed. The technique can be explained as follows:

1. When a terminal 1 moves from cell A to cell B then a handover event occurs i.e. the cell ID or area code changes and this is detected by the terminal software. This event acts as a trigger for the cellular terminal 1 to communicate with the server 5 so as to transmit this information to the database 4. The information can be transmitted as a single message using GPRS or by any other suitable message transport mechanism known to those skilled in the art.
2. The server 5 checks to see if handover A-B exists in the handover database 4b. If it exists then the location given by the best method for that handover is served as the terminal location. However, if the handover A-B does not exist in the handover database 4b further steps are required.
3. If handover A-B does not exist in the handover database 4b, but the reverse handover from B-A does exist then this can be used as the terminal location since it would normally be physically close to the A-B handover location.
4. If handover A-B or B-A do not yet exist in the database 4b. The server 5 still knows that the current location is within cell B and is also in the intersection with cell A:
   a. If location data for cell B already exists but the location of the previous cell A is missing then all that can be determined is that the cell terminal 1 is within cell B and so the cell B location data is provided as our best estimate.
   b. If location data for cell B does not exist in the cell location database 4a then a request is made for the location via the network operator 7.

c. If the request is successful, i.e. a location was returned, then the timestamp for the location provided is compared with the time of the handover. If the timestamp indicates a time after cell B was entered, then the new location data can be added to the location database 4*d* and filed as the location data for cell B. If the timestamp does not correspond with cell B then the cell ID that the timestamp corresponds with is checked and the location data may be added to that entry instead the entry for cell B.

d. If cell B data was obtained and cell A data also exists then the location for handover A-B can be calculated (as described in further detail below).

e. If cell B data was obtained but the previous cell A data is missing it can be determined that the cellular terminal 1 is within cell B and so the cell B location data is provided as the best estimate.

f. If cell B data was not obtained but cell A data does exist then the best location estimate should be the location data for cell A.

g. If cell B data was not obtained and cell A data does not exist then the best location estimate must be based on the last known location(s) of the cellular terminal 1.

It should be noted that the best outcome is outlined at (2) i.e. that the handover database 4*b* already contains the handover A-B location and this can be read directly. The next best outcome is (3), that the handover database 4*b* contains data for a B-A handover and this can be served as a good estimate of the location of the handover A-B. Another favourable outcome is (4d) that the cell location database 4*a* already contains data for cell A and B but does not have the handover A-B within the handover database 4*b*. Under these conditions the probable handover A-B location is calculated and then added to the handover database 4*b*. An estimate for handover B-A can also be made at this time and recorded in handover database 4*b*. For alternative outcome (4e), that only data for cell B is obtained then only a general location for the cell just entered can be employed as the present location of the cellular terminal 1. A less accurate outcome is (4f) that only cell A data is known so that the best estimate of location of the cellular terminal 1 is the location data for the cell. that has been left. The worst outcome is (4g) in that no information on either cell A or cell B is available such that only an old location can be employed as the best estimate of the location of the cellular terminal 1. It is however possible that the netlist database 4*c* will provide an estimated entry for handover location for A-B and so outcome (4g) is not found be a frequent occurrence.

Figure 6:
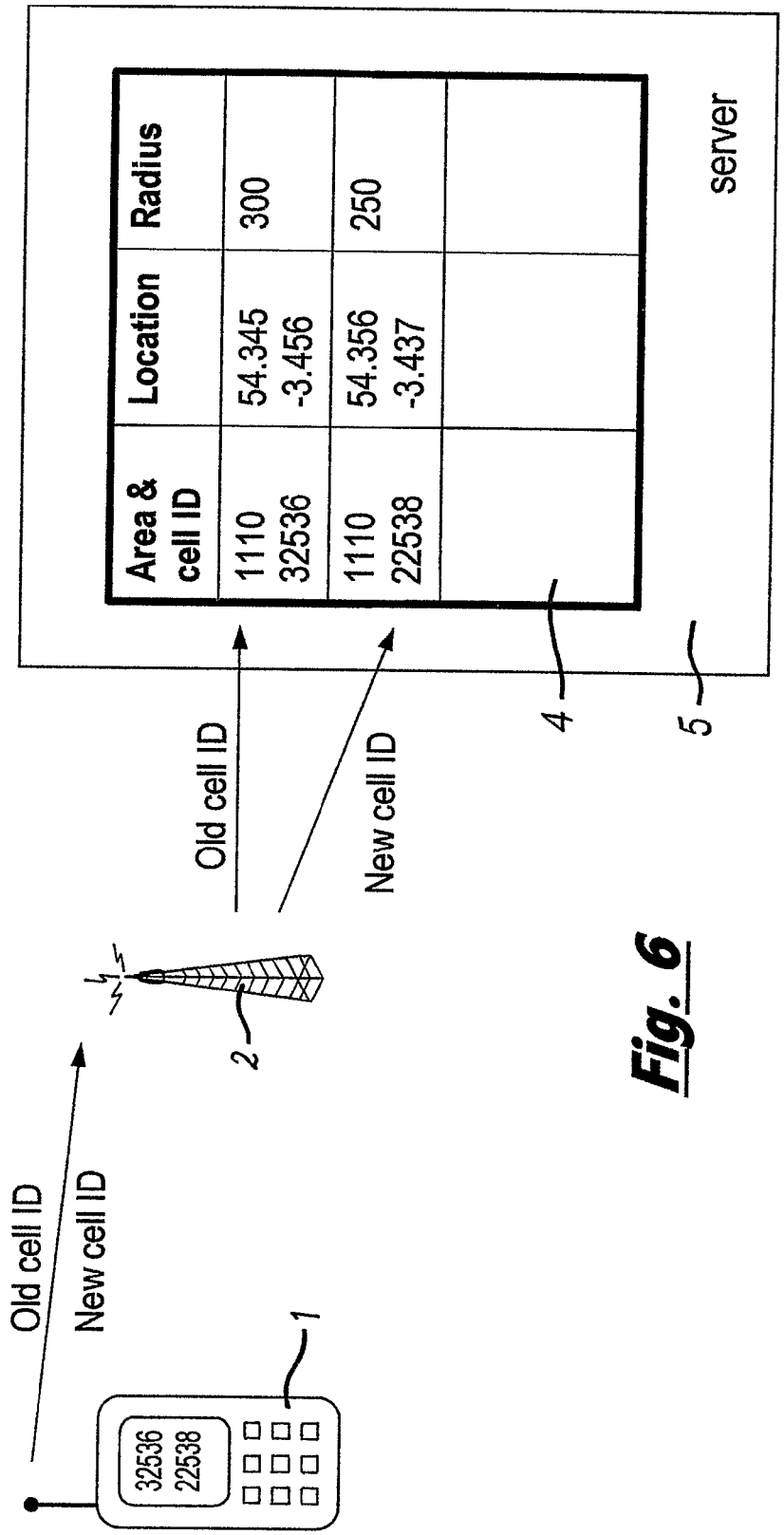
FIG. 6 presents a schematic representation of the cellular terminal communicating with the database during the handover of FIG. 4.

When the handover (4d) occurs, the two cell IDs are used to find two locations and their cell radii from the database 4 as represented schematically in FIG. 6. Basic geometry, or more complex algorithms incorporating additional information (as described below) are then employed to determine the position of the cellular terminal 1 and a probable error region. As described above, the database 4 contains a list of cell IDs, the locations at which they are positioned, as well as the radius or area of the cell 3 or cell sector 6 that they cover. Therefore, at the time of a handover a first estimate 8 of the probable location of the cellular terminal 1 can be narrowed down to the centre of a particular cell handover region 9.

The handover regions 9 themselves can be defined by any arbitrary shape but are typically defined by an ellipse defined by a centre, a minor and major axis and an orientation. The estimated signal angles of arrival from the base stations should also be included in the database 4. Additional parameters, for example, estimated distance from the base stations can also be included. Adjustments to the handover region 9 can be made based on particular handover conditions and regions can be sub-divided based on different handover power conditions or other suitable criteria, as discussed in detail below.

Figure 7:
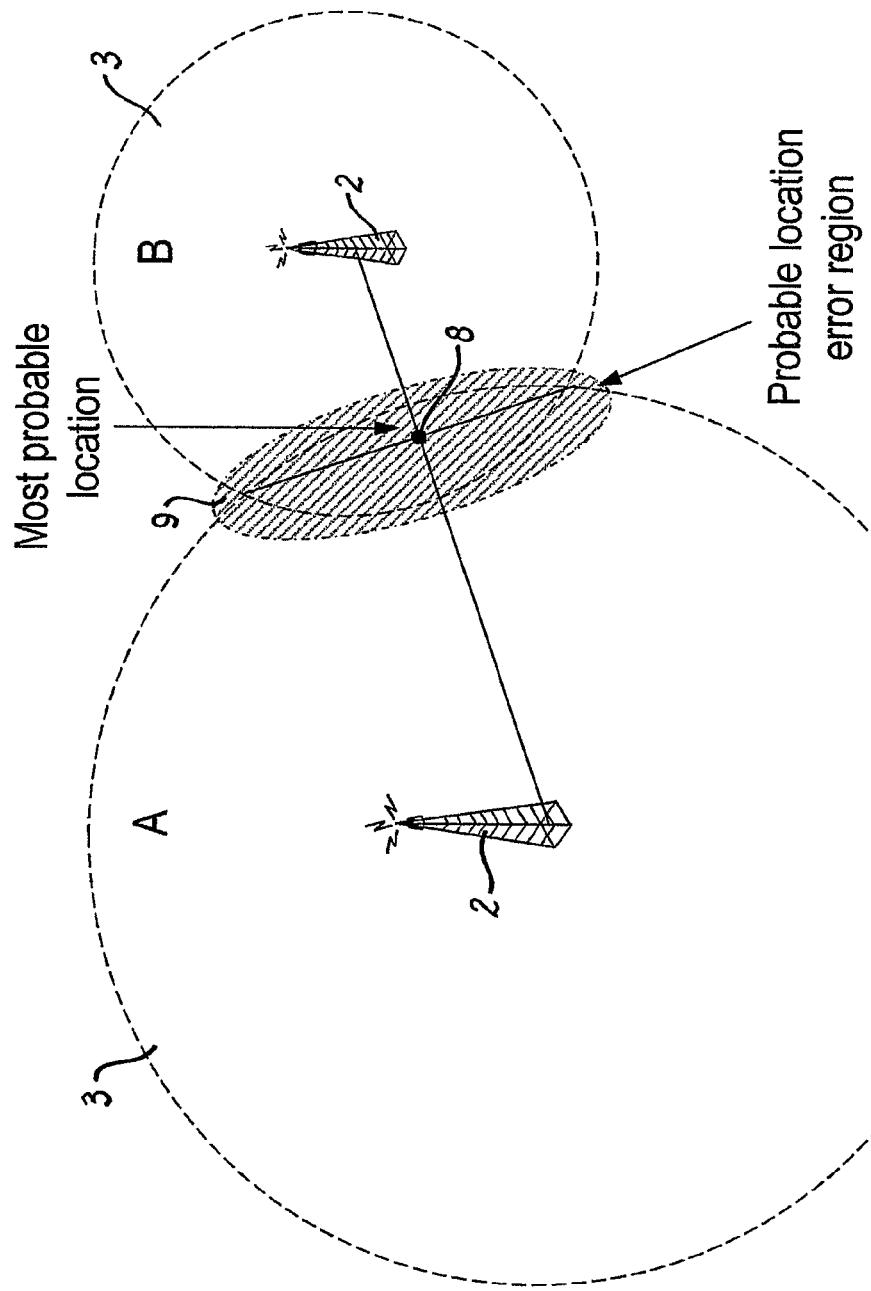
FIG. 7 presents a schematic representation of the handover of a cellular terminal between two cells of different sizes within a network.
Figure 8:
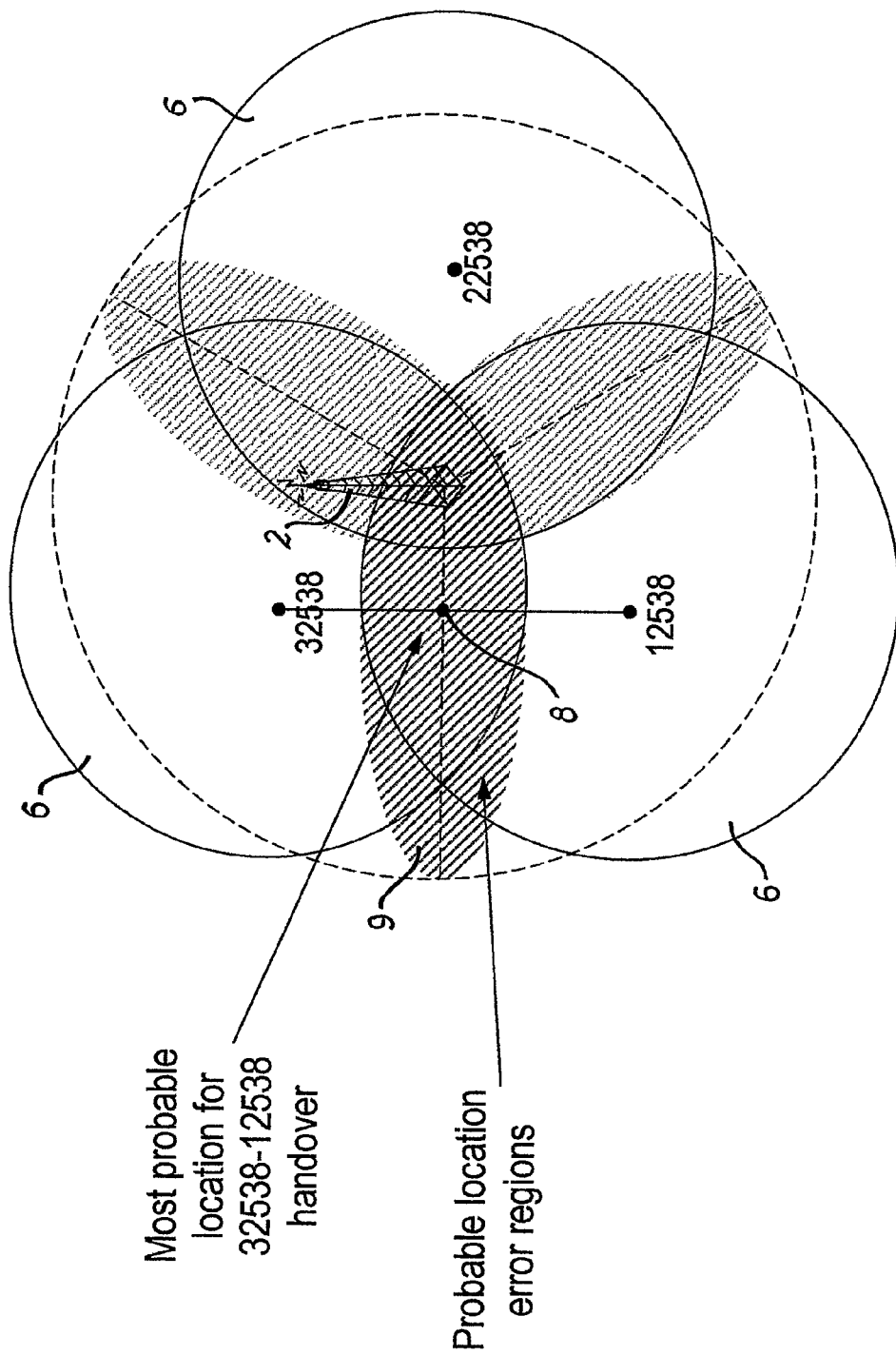
FIG. 8 presents a schematic representation of the handover of a cellular terminal between two cell sectors within a network.

Even when the cells 3 are of different sizes, as presented in FIG. 7, then the first estimate of the probable location and the probable error region can be found by simple geometry calculations. Similarly, where cell sectors 6 or subsectors (defined by timing, synchronisation offset or power) are involved, as presented in FIG. 8, then calculations are performed using the sector centre rather than the cell centre location.

Figure 9:
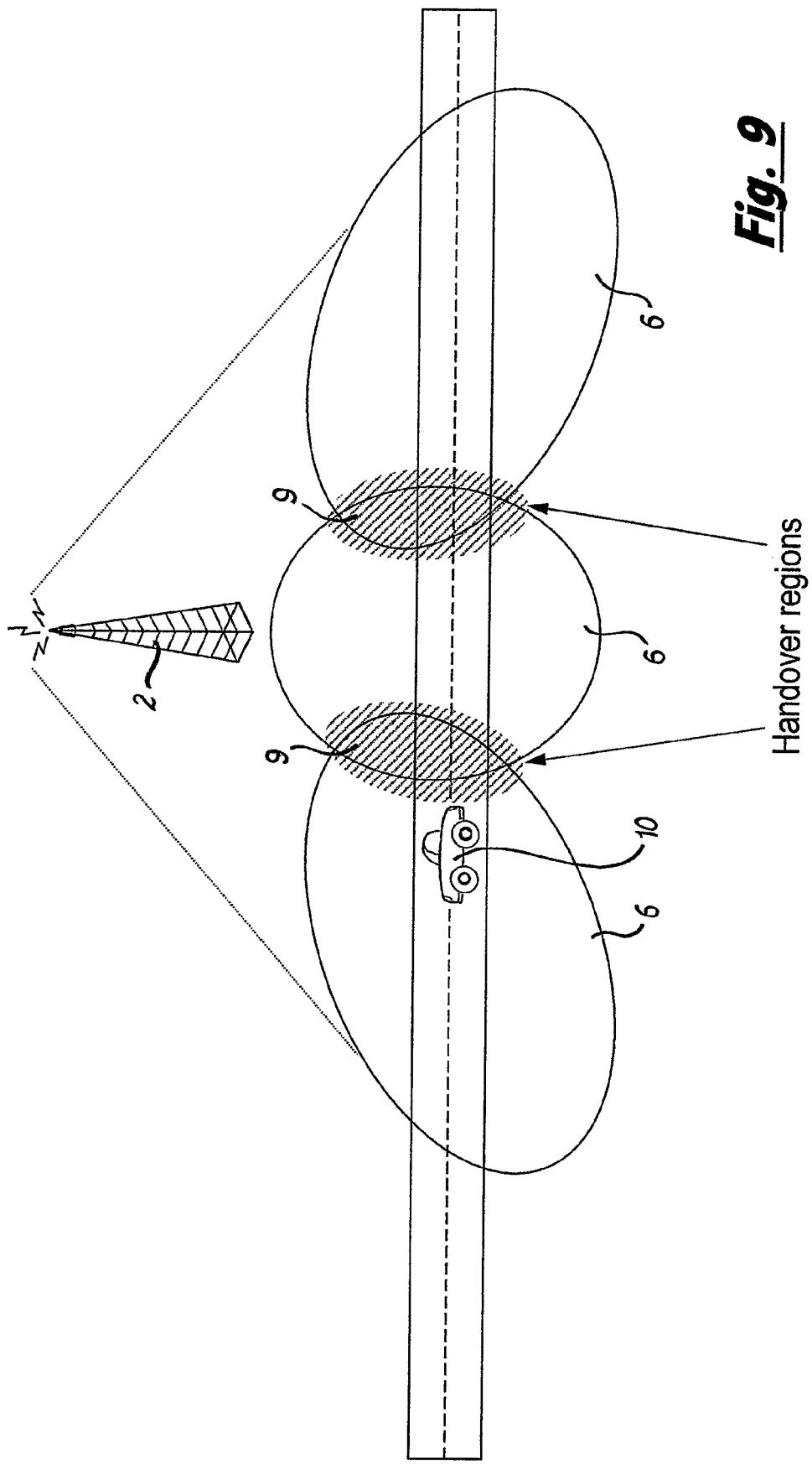
FIG. 9 presents a schematic representation of the handover regions of a cellular terminal between non-uniform cell sectors within a network.

FIG. 9 schematically presents the case where the cell sector 6 coverage pattern is non-uniform. With this cell sector 6 arrangement the calculations to find the probable location and error region must take this modified geometry for the non-uniform sectors into account.

It will be appreciated by those skilled in the art that within this embodiment the location of many cellular terminals 1 may be simultaneously tracked by, and stored on, the database 4.

In an alternative embodiment of the present invention the terminal information is sent directly to the server 5 that communicates directly with the database 4 at regular, or irregular, intervals rather than simply being triggered in response to the occurrence of a handover. The server 5 then determines when a handover occurs due to a change in the cell ID (and/or possibly the areas code or operator identity) and thereafter determines the location of the cellular terminal 1 as before. However, it is noted that this embodiment has the disadvantage that a significantly higher volume of information is required to flow between the cellular terminal 1 and the database 4.

In a further alternative embodiment the database 4, or a suitable subset of the database, is stored within the cellular terminal 1 itself. Within this embodiment the calculation of the location of the cellular terminal 1 is performed locally within each terminal.

It will be appreciated that it is equally valid to employ the above method from the network server 7 side without involving the calculation within cellular terminal 1. In this embodiment the network server 7 will automatically be aware of the occurrence of a handover without the need for separate calculations. Therefore, a network server may readily employ the above methods so as to monitor one or more cellular terminals 1.

Database Formation

There exist a number of methods that can be employed to build and maintain the required database 4. For example the network operator can provide data of the location for base sites, or coverage of their base sites or a netlist relating to their base station sites. Alternatively, this information can be derived from publicly available information. Using this information initial calculation of the handover locations can be made and recorded within the handover database 4*b*.

Secondly the database 4 can be constructed using the "cell of origin" location data or directly from alternative location data such as GPS satellite data. In a practical sense "cell of origin" data can be used to provide good coverage of the location service and GPS data can be added directly to the database to increase the accuracy at desired locations. The GPS data will provide a very accurate handover location that can be logged against the particular handover conditions such as power levels.

The database 4 can also be built and updated by relating information received by individual cellular terminals 1 from the network server 7 with cell and area IDs measured at the terminals themselves. With this method the terminal 1 can measure the cell ID but may not initially be able to determine its location if the database has no entry for this particular cell ID. However, the location service offered by network operators can be used to determine the location as follows.

Figure 10:
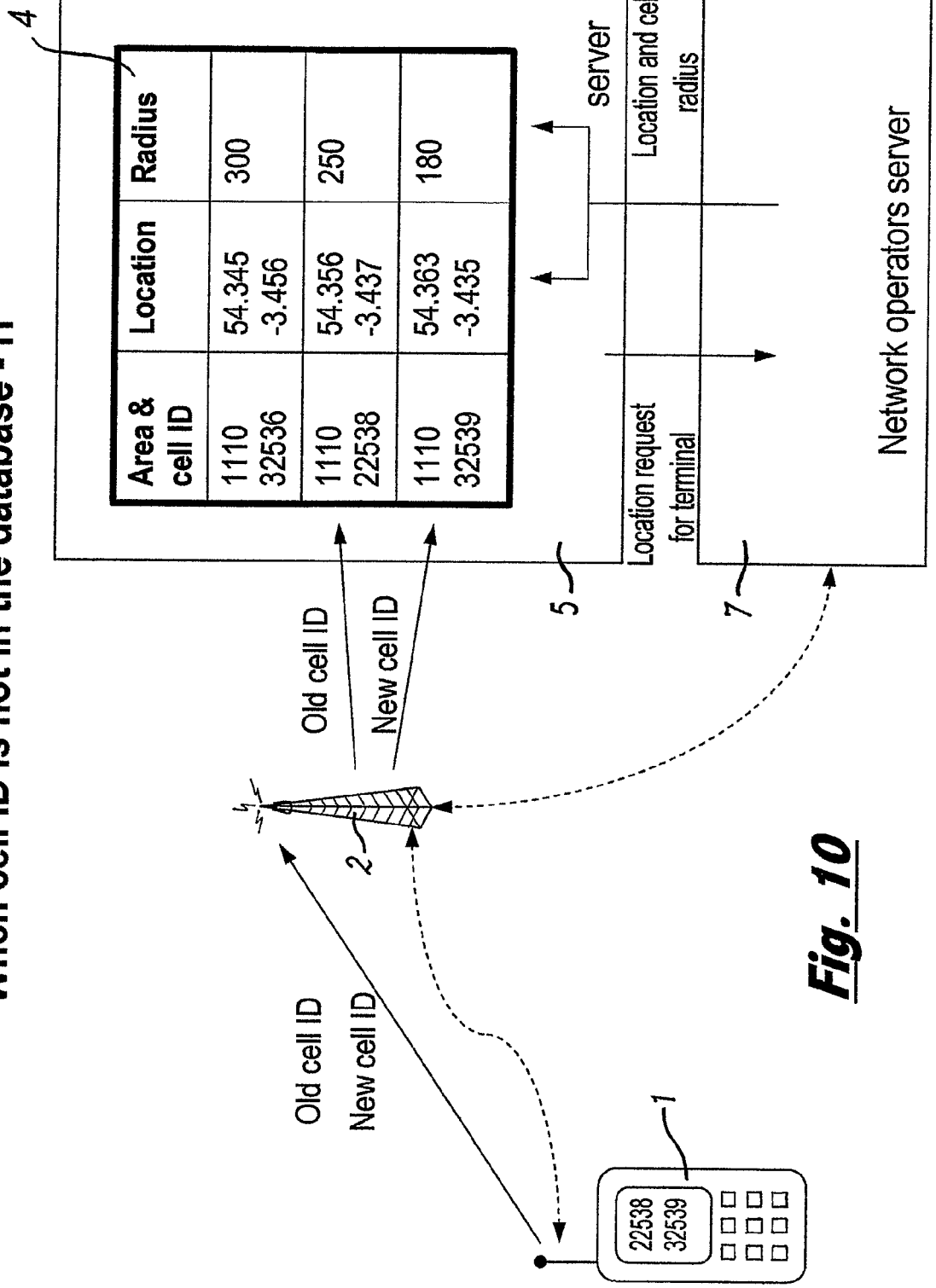
FIG. 10 presents a schematic representation of a method employed to complete the database recorded on a server.

When a cell ID is recorded which has missing database data then a location request for that terminal is sent to the network server 7. The network server 7 will respond with the location and cell radius or area data. This data is then added to the database 4a against the recorded cell ID for that terminal, as presented schematically in FIG. 10. The time of the location measurement by the operator must be matched with the cell ID that was recorded for the same time otherwise an error can occur due to latency. The terminal clock does not need to be matched to that of the network server 7 but the estimated offset between the clocks must be noted in order to reduce the possibility of errors due to system latency.

In addition, as will be appreciated by those skilled in the art, a cellular terminal 1 is capable of detecting signals sent from networks other than those for which the cellular terminal 1 actually has a service contract. Thus a cellular terminal 1 with a contract with the Orange network could still be used to extract information from the networks of $O_2$, Vodafone, T-mobile etc so as to supplement the database 4, as appropriate.

A further option is to carry out an initial drive test that employs a location technique described in the prior art e.g. cell of origin, GPS solutions and/or triangulation methods. These tests would thus provide the location information that has been mapped to the cell and area IDs as well as providing a means for checking the accuracy of this information.

A further option is to automatically collect cell ID and area ID data from GPS equipment deployed in the field. This opportunistic method avoids the need to carry out specific drive tests.

In order to maintain the accuracy of the database 4 the above-described methods can be employed, either periodically, randomly or when some inconsistency is detected to check that the information contained within the database 4 is up to date. For example, after every 100 uses of that cell ID the information can be verified by making a location request to the network server 7 and comparing this information with that contained in the database 4.

In summary the data within handover database 4b held within the database 4 can be derived in a number of ways:

1. The cellular terminal 1 can be used to obtain the location of the two cells involved in a handover.

This enables the centre of the probable handover region to be defined and this can be written into the handover database 4b e.

2. GPS data can be used to mark the location of the handover events and this can be written directly to the handover database 4b.

3. Netlist data can be used to determine the probable location of handovers for which there is no clear data.

The database will contain a handover method code for each entry indicating how the data was derived e.g. 00 Cell ID method, 01 GPS method, 02 A-GPS method and 03 Netlist method.

Improving the Accuracy of Calculated Handover Locations

There are a number of techniques that can be employed to increase the accuracy of the method of calculating the handover locations of a cellular terminal 1. In the first instance, recording the received signal strength before and after the handover can provide a suitable parameter for increasing the accuracy of the location estimate since handovers can result from both coverage and capacity issues. In other words, the network traffic and the terminal's location are both factors that influence when a handover will occur.

Figure 11:
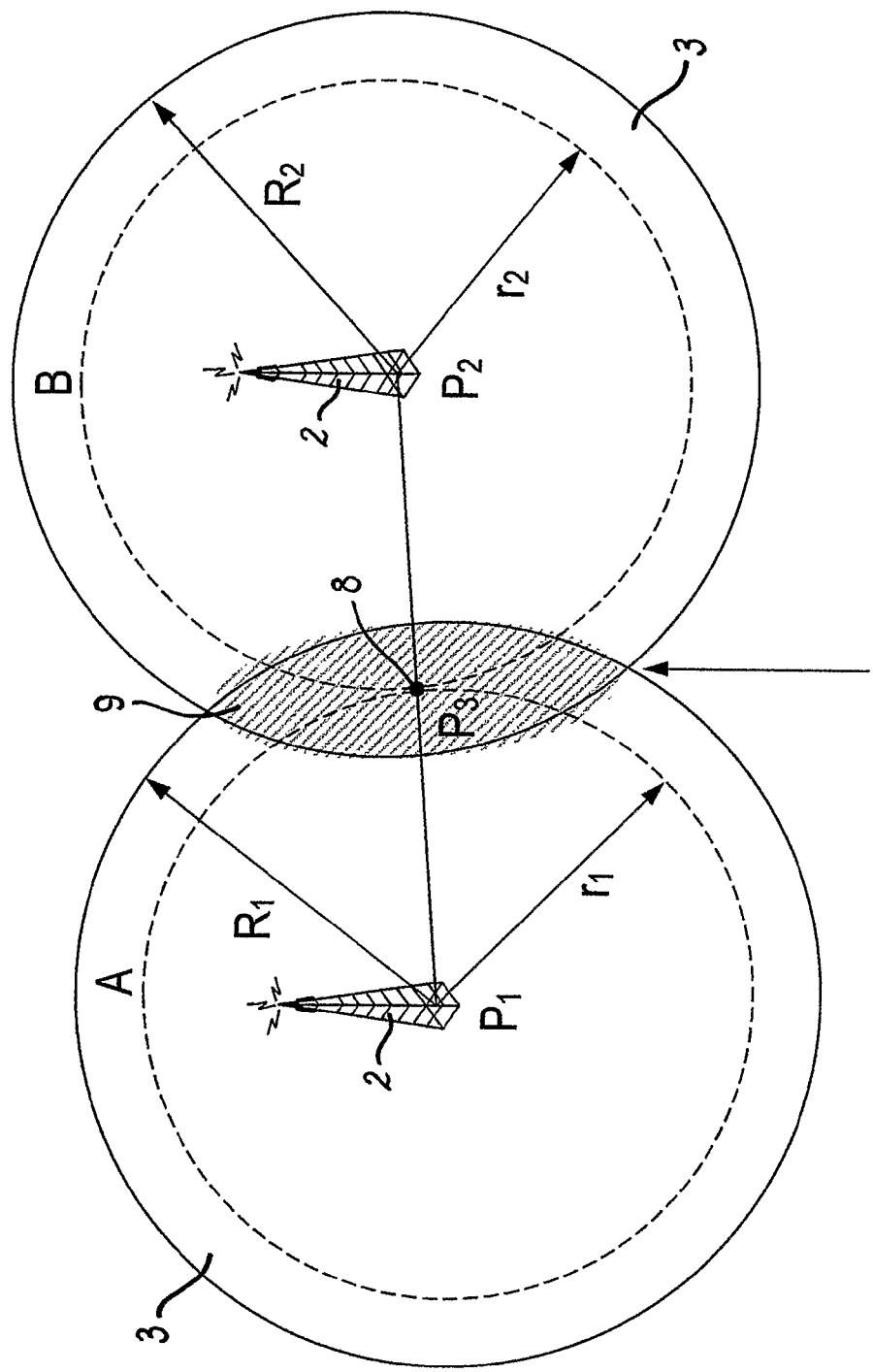
FIG. 11 presents a schematic representation of the handover region for a cellular terminal between two base stations of equal transmission signal powers.

An example of a method of enhancing the accuracy of the method by utilising the signal strength measurements shall now be described with reference to FIGS. 11 to 15. FIG. 11 presents two cells 3 served by base stations 2 that transmit powers $P_1$ and $P_2$, respectively. $R_1$ and $R_2$ give the radii of the respective cell coverage. As can be seen the coverage for these two cells overlap so as to define the expected handover region 9. If both the cells are of the same radius (i.e. $R_1=R_2$) and the transmit powers $P_1$ and $P_2$ are also equal ($P_1=P_2$) then it can be expected that at the centre of the handover region 9 a cellular terminal 1 will receive equal power, $P_3$, from both base stations 2. In this case the handover region 9 is based on the assumption that the handover will occur when the signal power received from one transmitter exceeds the power received from the other by any amount. It is also assumed that the propagation loss characteristics are the same for both cells.

Consider now that the effective radii to the handover point are $r_1$ and $r_2$, respectively, and the distance between the two base stations 2 is d. CL represents the coupling loss for the transmitter and $\alpha$ is the path loss exponent (a value of 2 representing freespace).

Therefore, the following expressions can be derived:

$$d = r_1 + r_2 \quad (1)$$

$$\Delta P = P_1 - P_2 \quad (2)$$

$$P_3 = P_1 - CL - 10\alpha\log_{10}(r_1) \quad (3)$$

$$P_3 = P_2 - CL - 10\alpha\log_{10}(r_2) \quad (4)$$

$$\Delta P = 10\alpha\log_{10}\left(\frac{r_1}{r_2}\right) \quad (5)$$

and so if $r_1=r_2$, then $\Delta P=0$ as expected.

Figure 12:
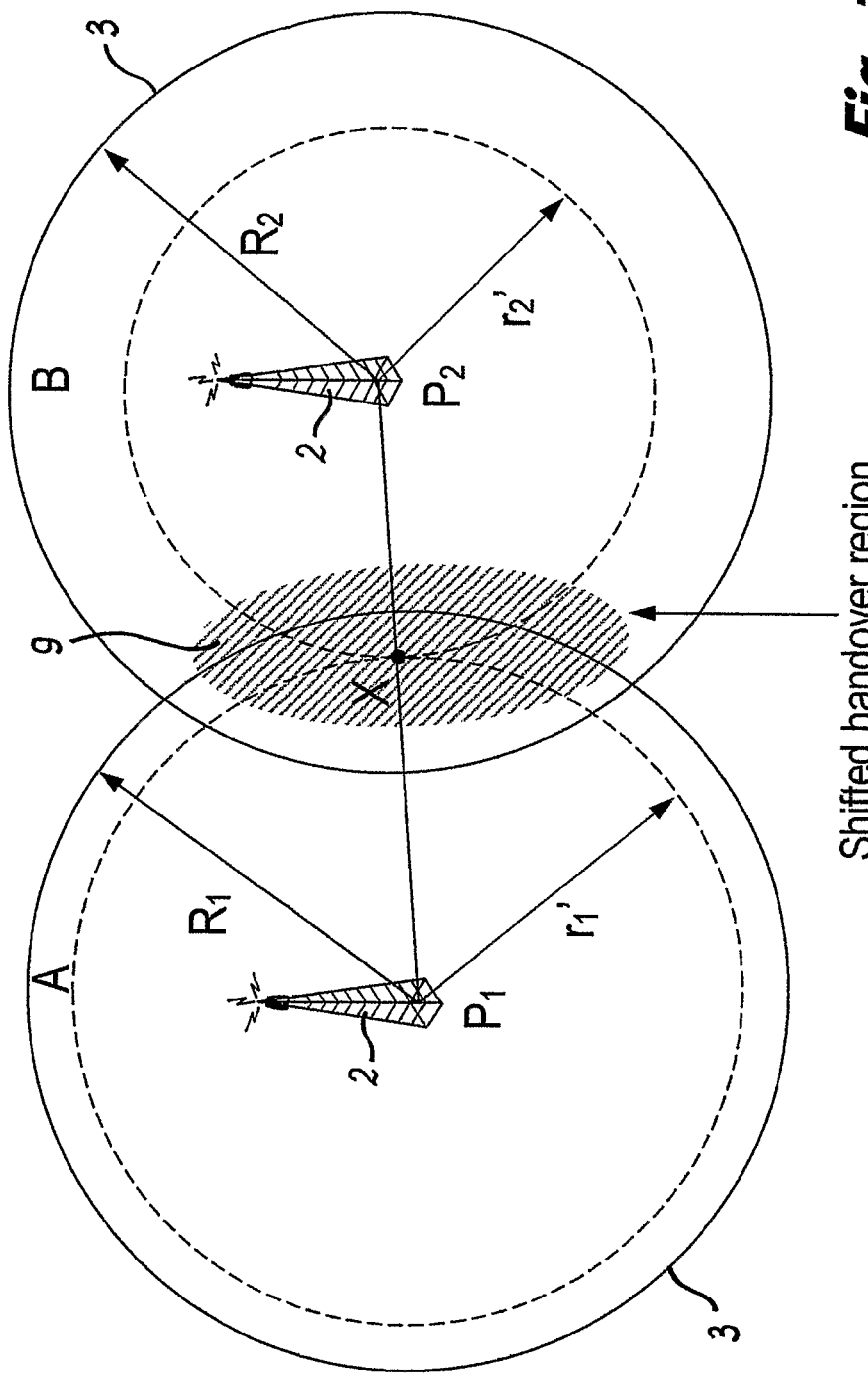
FIG. 12 presents a schematic representation of the handover region for a cellular terminal between two base stations of unequal transmission signal powers.
Figure 13:
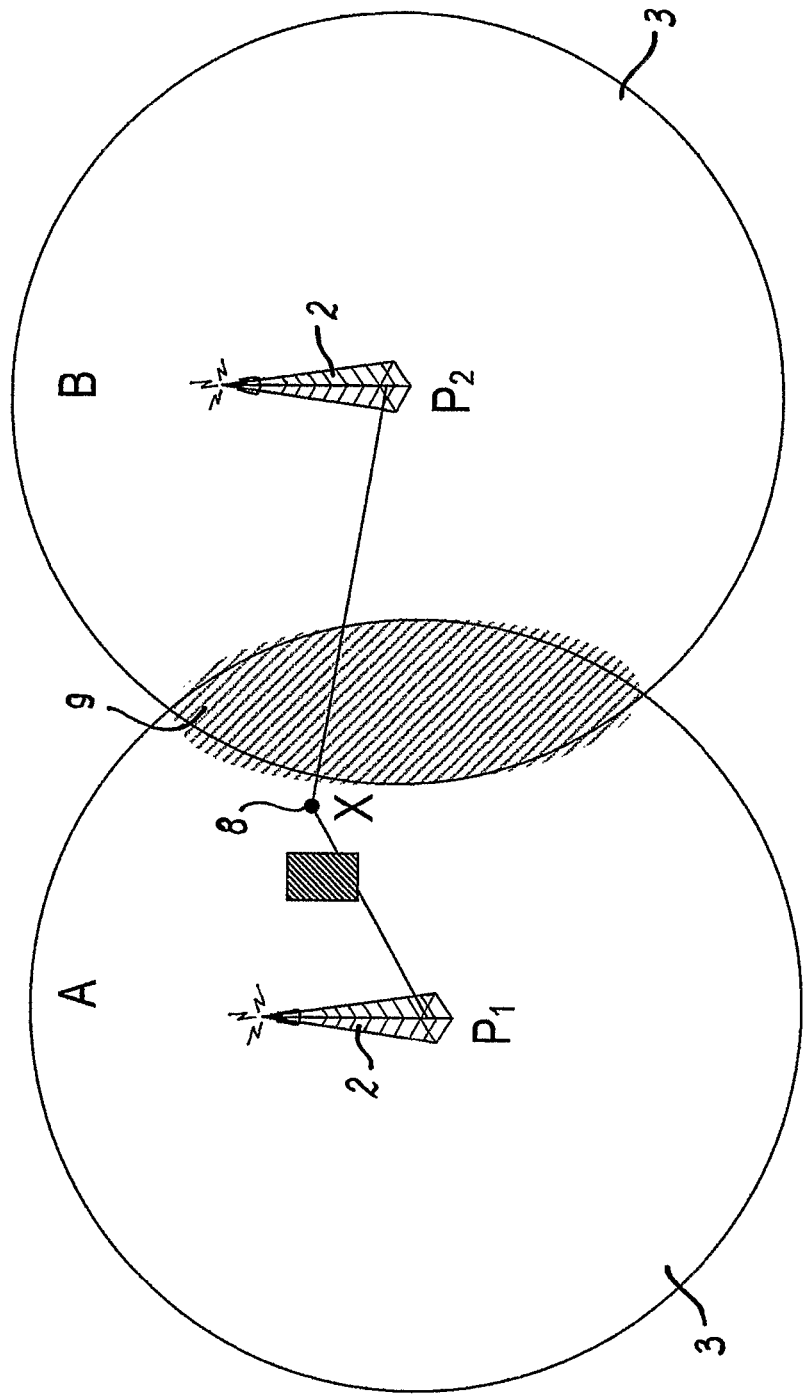
FIG. 13 presents a schematic representation of the handover region for a cellular terminal that employs transmission signal powers to detect shadowing.
Figure 14:
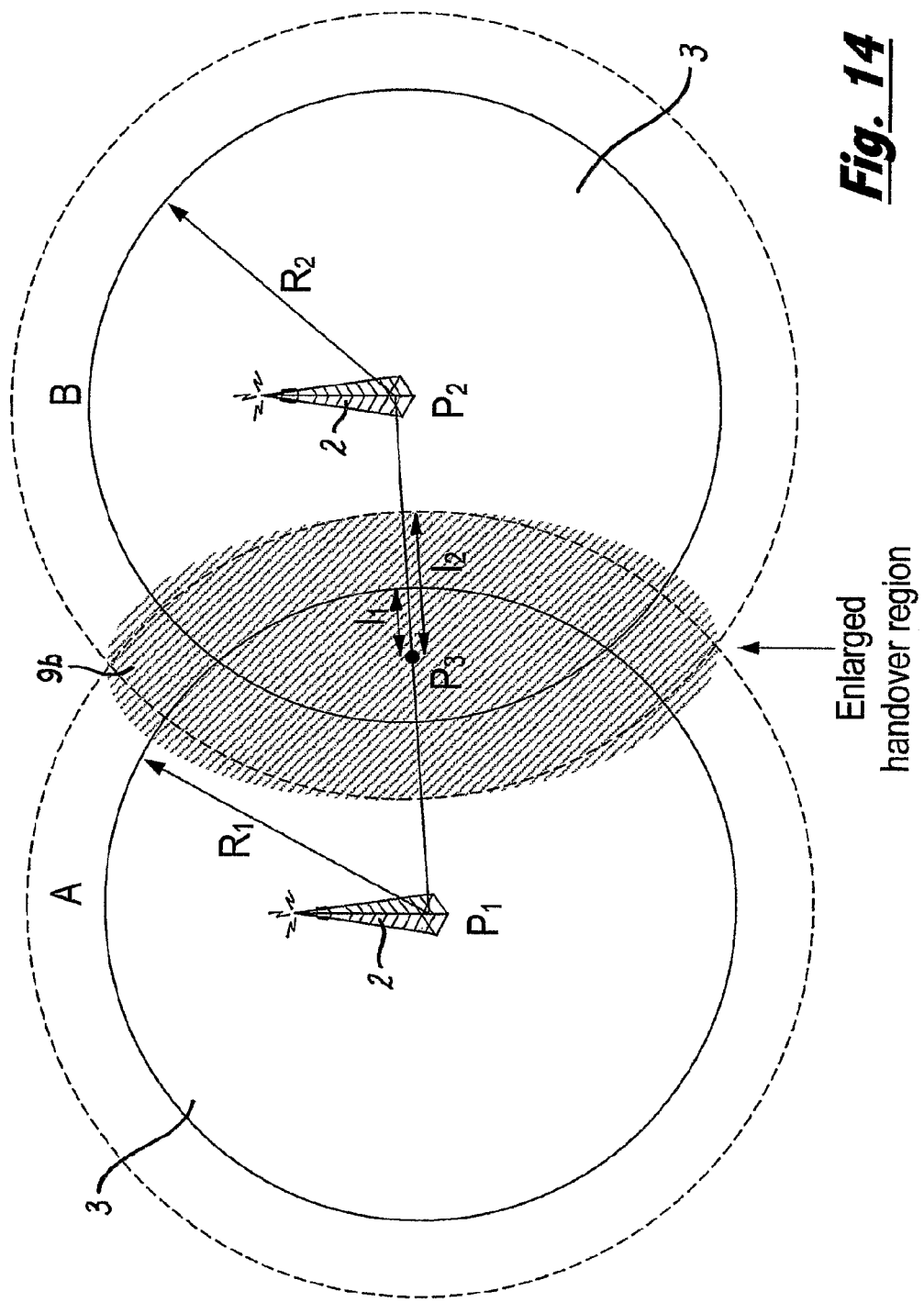
FIG. 14 presents a schematic representation of an enlarged handover region for a cellular terminal employed to compensate for the effects of shadowing.

Now consider the more realistic case, presented schematically in FIG. 12, where the handover is delayed until the signal power from the second cell exceeds the signal power of the first by, for example 3 dB. In this way the expected handover point will be shifted towards the second cell. If the difference between the signals at the handover point, X, is represented by $\Delta HO$ then this value can be obtained by comparing the difference between the signal powers immediately before and after a handover. The new equations are thus found to be:

$$d = r_1 + r_2 = r'_1 + r'_2 \quad (6)$$

$$\Delta P + \Delta HO = 10\alpha\log_{10}\left(\frac{r'_1}{r'_2}\right) \quad (7)$$

$$r'_1 = \frac{d}{10^{\frac{\Delta P+\Delta HO}{10\alpha}} + 1} \quad (8)$$

From the above equations it can be seen that the handover region is shifted according to the difference between the signal powers $P_1$ and $P_2$. In typical cases the shift might be relatively small. However, in the cases of forced handovers due to capacity rather than coverage issues then $\Delta HO$ could be high (e.g. >10dB) causing a large shift to the handover region. The above equations apply not just when the cells are the same size, but also for the case when the cells are of different sizes. Of course, one further reality is that the propagation loss of the signals is not uniformly represented by the pathloss exponent. System measurements will enable the typical value for α to be adjusted according to what is physically observed.

A further point to note is that shadowing also causes significant deviations from the expected propagation losses indicated by the linear equations. This can lead to an increased probability that the location lies beyond the expected handover region, as presented in FIG. 13. The solution to this detrimental effect is to detect the extent to which the signal is shadowed and to compensate for this by expanding the probable handover region. This can be done by comparing the signal power before and after handover with those of a typical handover between the same two cells. The increase in signal power indicates the extent of the additional shadowing and so determines the value by which the cell handover region should be increased. There will now be a high probability that the cellular terminal 1 exists within this enlarged cell handover region 9b, shown in FIG. 14.

As previously described the existing cell handover region 9 is already defined and can be quantified by $l_1 = R_2 - r_2$, see FIG. 11-14. The enlarged handover region 9b can be defined by $l_2$, see FIG. 14, such that:

$$\Delta SH = 10\alpha \log_{10}\left(\frac{l_2}{l_1}\right) \quad (9)$$

where ΔSH is the deviation from the normal handover power level.

Figure 15:
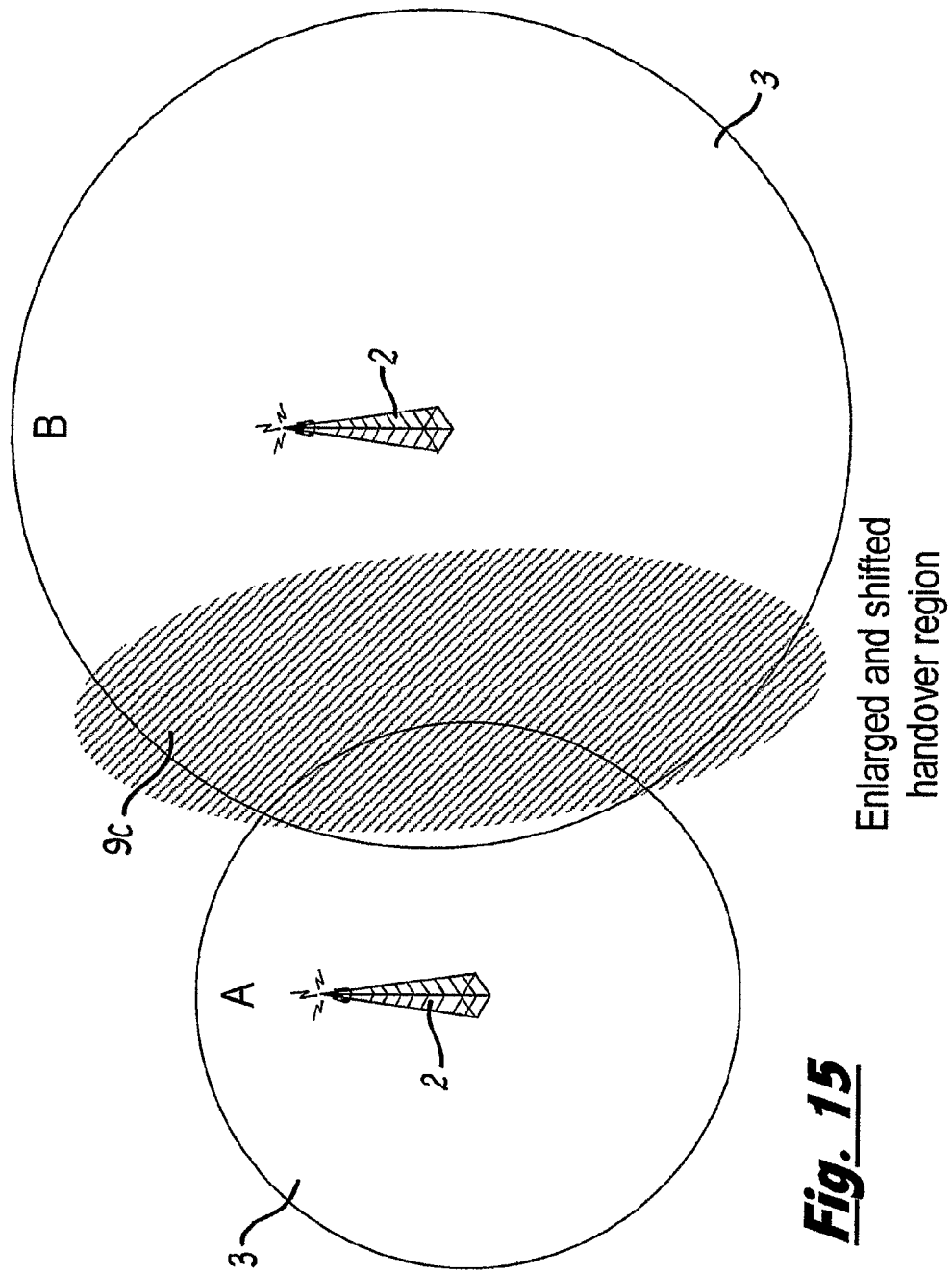
FIG. 15 presents a schematic representation of an enlarged and shifted handover region for a cellular terminal between two cells of different sizes within a network.

The techniques used to shift or enlarge the handover region 9c can be applied together and the techniques are also found to hold for adjacent cells 3 which are of a different size, see FIG. 15. Therefore, by using signal strength measurements in addition to the techniques described earlier it is possible to increase the accuracy of the location estimate. Alternatively timing or synchronisation measurements can be used in place of, or in conjunction with, power measurements.

In certain situations it is possible to create forced handovers, either in the form of network server forced handovers or cellular terminal forced handovers. These can be used to further increase the accuracy of the location measurements. For example if a cellular terminal 1 can force a handover then measurements for other adjacent cells 3 or cell sectors 6 can be made. Combining these measurements, especially in cases where the cellular terminal 1 is static or slow-moving enables the location accuracy to be increased. This is achieved by comparing the regions of overlap of the cells or cell sectors and also considering other factors such as signal strength or timing or synchronisation information to determine the most likely location of the cellular terminal 1.

Figure 16:
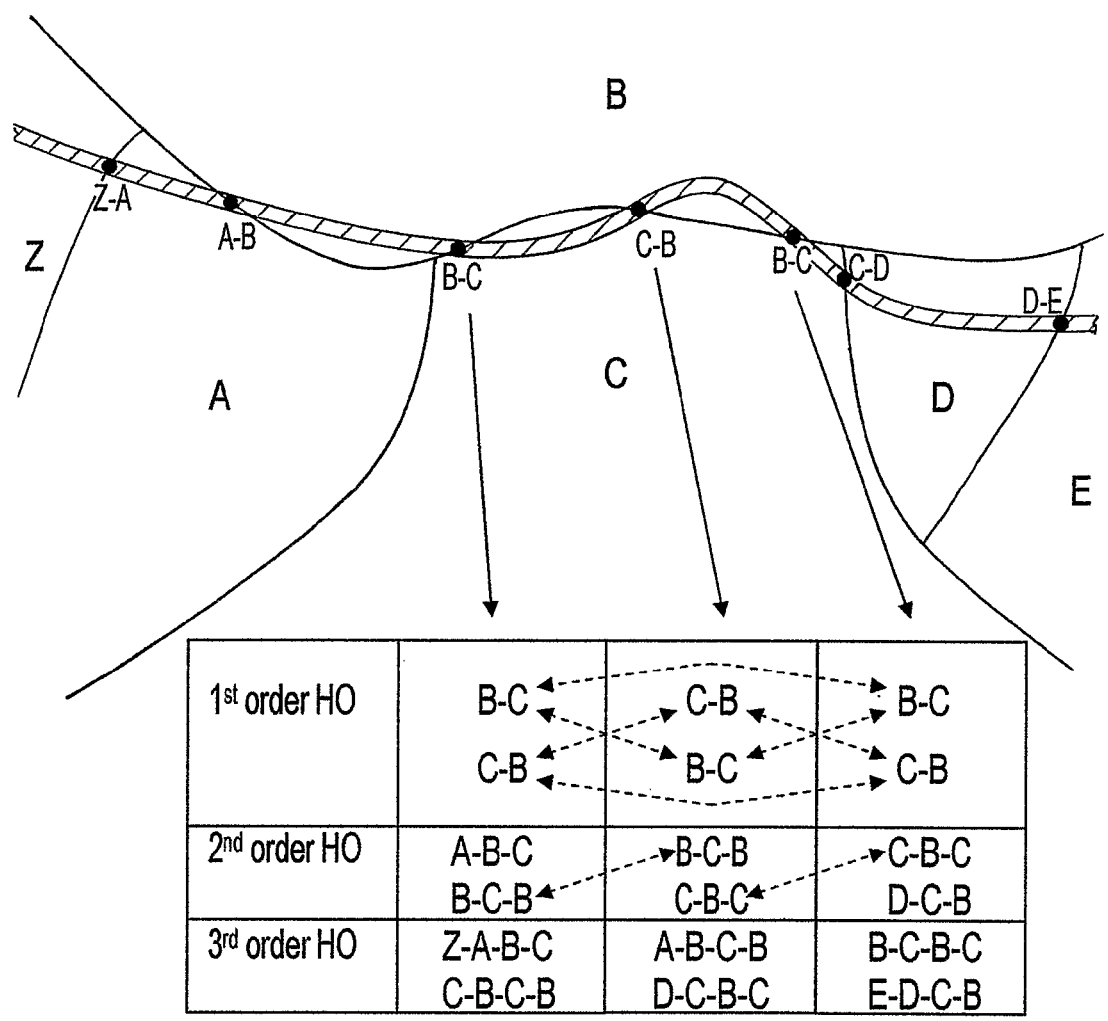
FIG. 16 presents a schematic representation of first, second and third order handover events.

The above methods employ handover locations that are defined by the two cells involved in a particular handover. However, the method can be readily extended so as to employ three or more cells (i.e. 2 or more sequential handovers). As an illustration of employing higher order handover events to resolve handover location ambiguities consider the schematic representation presented in FIG. 16.

This particular scenario shows a road that passes through cells Z, A, B, C, D and E each of which comprises a boundary of irregular shape. At certain points on the route the terminal returns to a previously observed cell. The enclosed table shows the different handover events that would be observed in the above scenario. The upper entries in each table cell correspond to entries experienced if the cellular terminal were travelling from left-to-right, while the lower entries correspond to. a right-to-left movement. The dotted lines show where there are potential ambiguities in this scenario.

As can be seen there exists six possible ambiguities for simple $1^{st}$ order handovers. However for $2^{nd}$ order handovers only 2 potential ambiguities exist, while all of the ambiguities have been eliminated with the use of $3^{rd}$ order handovers. Therefore in certain circumstances it can be seen that it is useful to define handover locations based on a sequence of handover events that may relate to a particular route. Using $2^{nd}$ and $3^{rd}$ order handovers allows for the separation of handover events based on the current handover event given the previously observed handovers.

Figure 17A:
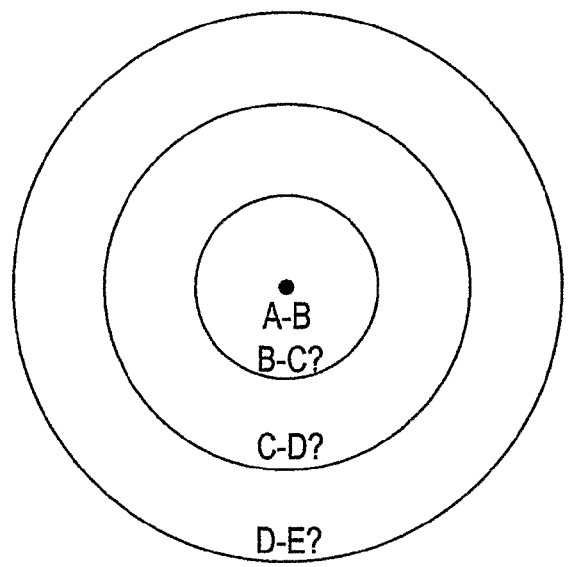
FIG. 17 presents a schematic representation of how knowledge of a particular netlist can be employed to increase the accuracy of the method of monitoring the cellular terminal. In particular, presented are schematic representations of:
   (a) an increasing uncertainty region associated with a moving cellular terminal;
   (b) the employment of a netlist to estimate locations of unknown handovers; and
   (c) the employment of a known handover location to refine the estimated locations.

Other improvements can be made in the location of the cellular terminal 1 by employing strategic assumptions as to the most probable location areas. For example, consider the scenario illustrated in FIG. 17(a). In this case a handover from cell A to cell B is detected and the location estimate for this handover A-B is known. Now when the terminal moves it will eventually be involved in another handover, say to cell C. If the location of handover B-C is unknown then all that is known is that handover B-C is a neighbour of handover A-B and so will be some, unknown, distance and direction from A-B. If further handovers C-D and D-E are experienced and their location is not known then the distance of the cellular terminal from handover A-B will most probably have increased, but the distance and direction is still unknown.

Figure 17B:
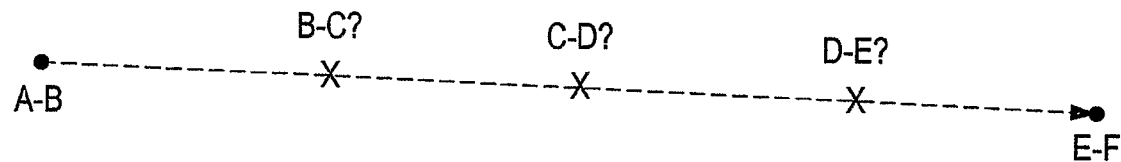

The uncertainty region will continue to grow until it is possible to obtain the location for another handover. When this is achieved then it is known that the other handovers exist in space somewhere between the two known handovers A-B and E-F, as illustrated within FIG. 17(b). Here handovers B-C, C-D and D-E are located between the known handovers with equal spacing.

Figure 17C:
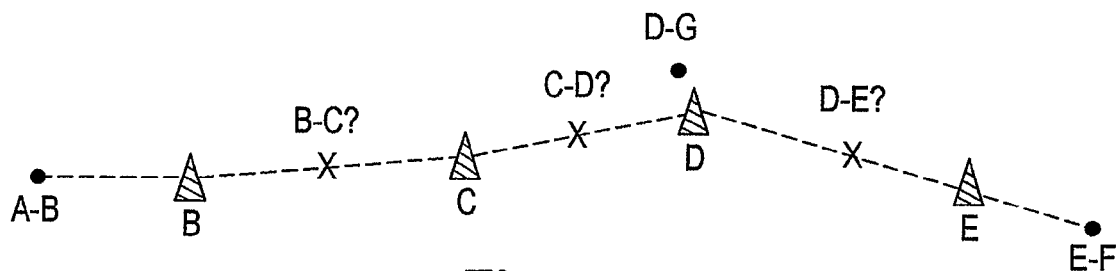

It is then possible to use the netlist to extract additional information so as to assist in placing probable handover locations based on information relating to adjacent cells. Consider FIG. 17(c). Here probable base station locations are placed between, or in the centre of, all the associated handovers e.g. base station D is estimated to lie between handover C-D and handover D-E. Now if additional information is known about the location of handover D-G then given the estimated handovers involving cell D, handover D-G can be placed at the centre of all observed handovers involving D. By relocating cell D using the three handovers a refined estimate for the locations of handovers C-D and D-E, which were at unknown locations, can be made on the assumption that they are equidistant between cell C & D and D & E, respectively. This in turn causes other adjustments of adjacent base stations and handovers. A number of iterations can be used to allow the unknown handover and base station locations to be repositioned based on the influence of known locations and the netlist interconnections.

A second example involves locating the cellular terminal 1 on roads or railway lines as a reliable way to improve accuracy. An illustration of this method is now given with reference to FIG. 18.

Figure 18A:
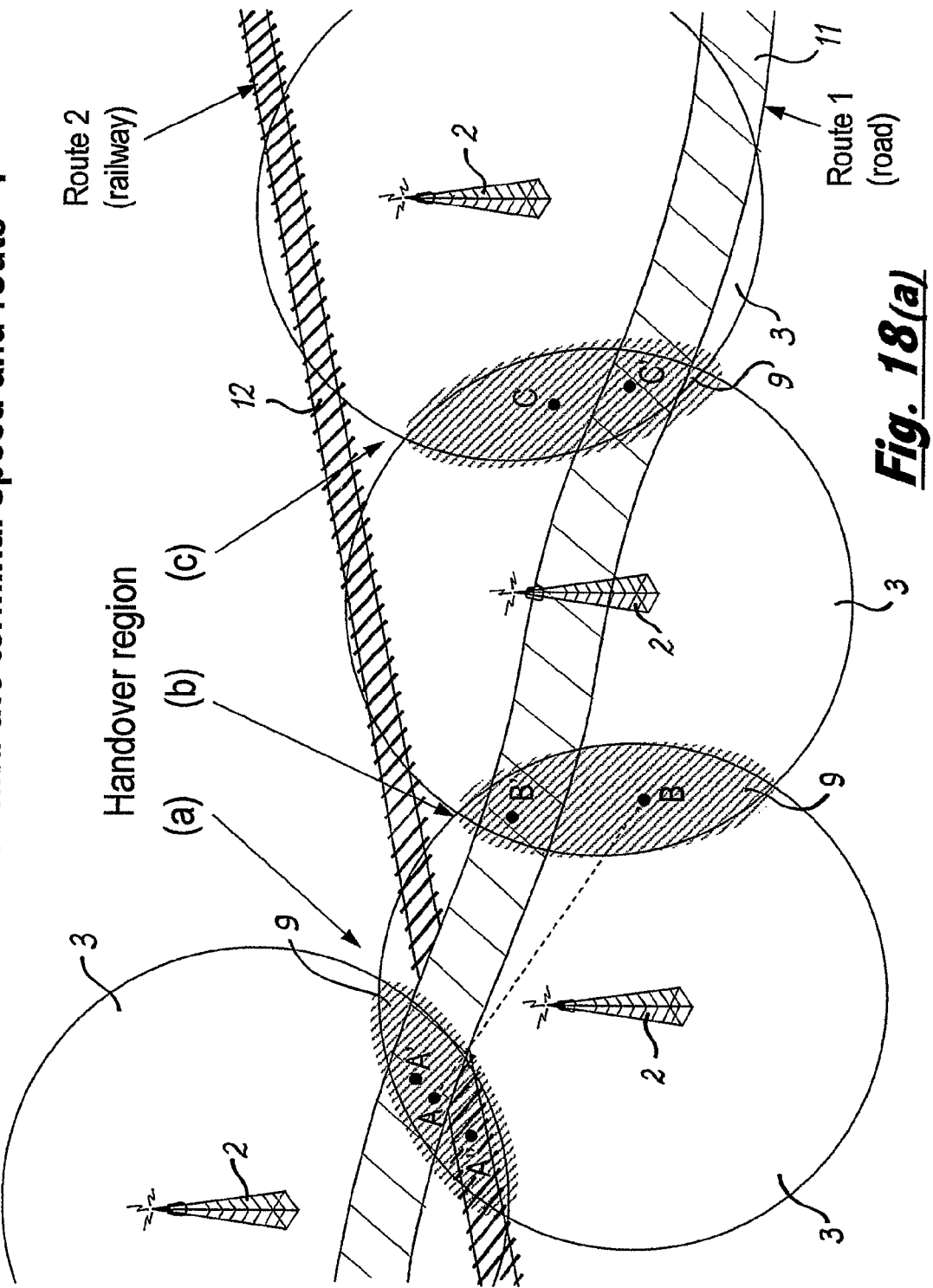
FIG. 18 presents a schematic representation of how knowledge of the local geography can be employed to increase the accuracy of the method of monitoring the cellular terminal.

Consider the case where two handovers have taken place between three cells, the first, in cell handover region (a) and the second, in region (b), see FIG. 18(a). It is then possible to estimate the speed of the terminal based on the time between handovers and the known distance between the centres of the two handover regions shown as points A & B. Now consider that the speed estimate was found to be ~43 mph. It can therefore be assumed that the cellular terminal 1 is within a vehicle 10, see FIG. 18(b), and so mapping the locations to the most probable route will increase the accuracy of the location measurement.

Once the decision to map the cellular terminal 1 to a route is made it is necessary to determine what is the most likely route. From FIG. 18(a) it can be seen that within region (a) there are two potential routes within the cell handover region. The possible position on these routes might be A' on the road 11 or A" on the railway line 12. However, only one of these routes still exists in region (b). Thus if a second handover is recorded in region (b) then it can be assumed that the most likely route is the road 11. It can then be assumed that the positions of the most likely location at the handovers were A' and B', respectively, which represent the centre of the intersection of the road 11 and the handover region (a) and (b). From points A' & B' the speed estimate can be revised.

Figure 18B:
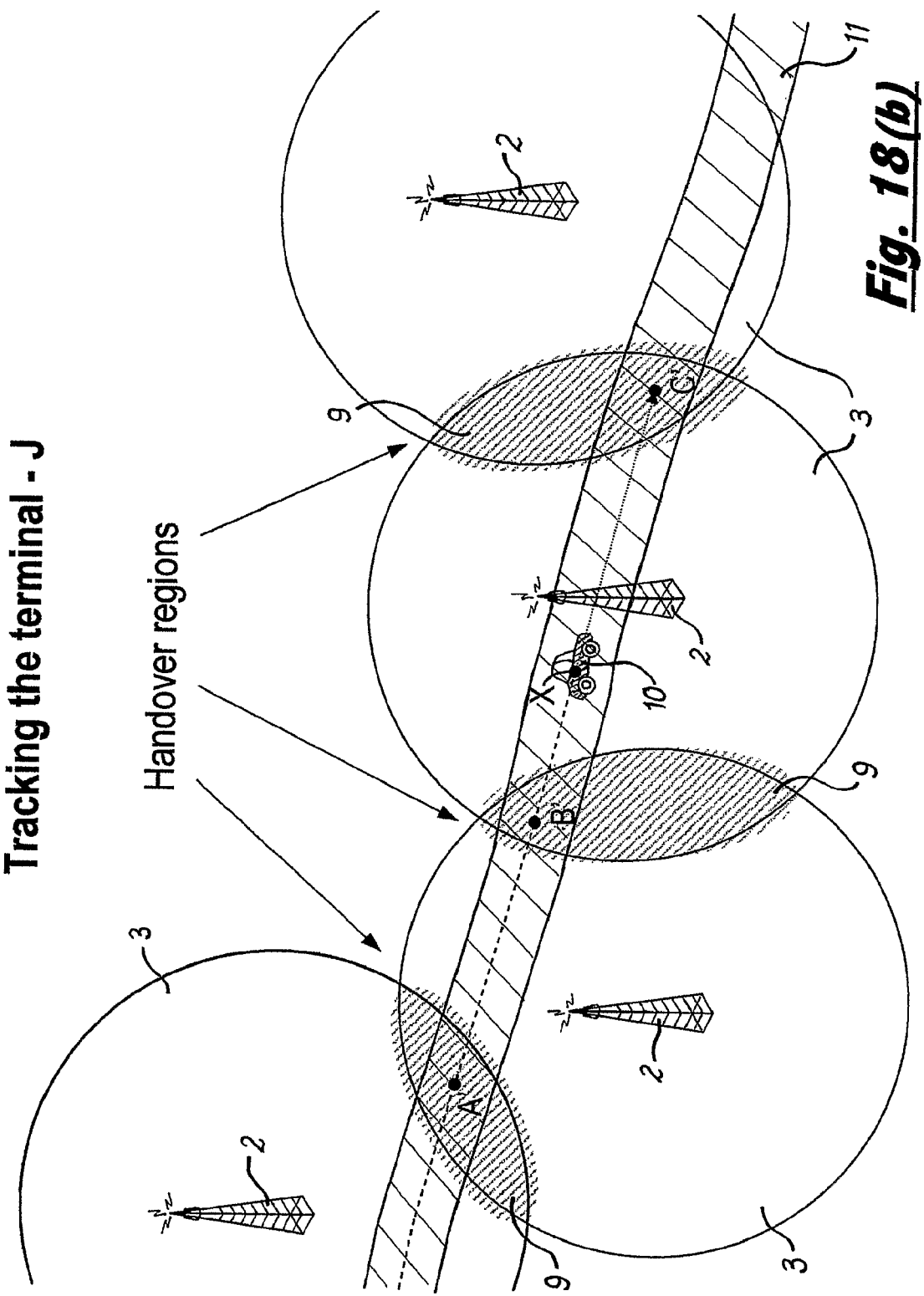

When the next handover occurs in region (c), see FIG. 18(b), the above assumptions can be verified and the assumption that the cellular terminal is on the road 11, and not the railway line 12 confirmed by consideration of which routes intersect with all three handover region. At point C' the speed estimate can again be updated again based on the time and distance between the handover points at B' and C'.

If more than one route exists in several consecutive handover regions then metrics are used to determine the most probable route. These metrics might include the minimum distance between the centre of the handover region to the alternative routes and also the expected speed on the alternative routes. Other constraints (e.g. bus routes, historical data, etc.) can also be employed, as required.

To track the cellular terminal's 1 location in real-time it is necessary to continually update the estimates of the cellular terminal's 1 speed e.g. at points B' and C'. This updated speed is then employed, along with the assumed route and known time at certain estimated points A', B' and C', to determine the probable location at any point in time. Sometime after the time relating to the estimated location at point B' the cellular terminal's 1 position will be at point X. This time can be predicted by the estimated speed of the cellular terminal 1, the known trajectory along the route and the time elapsed since the terminal was estimated to be at point B'. Furthermore, the time to the expected handover at point C' can also be predicted. If the cellular terminal 1 does not make a handover at point C' close to the time expected then it can be assumed that the cellular terminal 1 has slowed down, stopped, or even changed route or direction. This information can then be used to adjust the predicted location.

A further parameter that can be monitored to provide information about the location of the cellular terminal 1 is the history of the signal strength. The history of the signal strength can be employed to predict whether the cellular terminal 1 is travelling towards or away from a base station 2. This parameter can also help determine whether the cellular terminal 1 passes close to a particular base station 2 or not. This information can be used to enhance the location accuracy and probable terminal trajectory. If signal strength profiles are also known (by prior measurements) along particular known routes then this information can be matched with live measurements to predict the position of a vehicle 10 (e.g. a bus or car) travelling along the route.

A yet further alternative method of locating a cellular terminal based on a database of handover regions shall now be described. The same general techniques described above are employed however in this embodiment the database holds data relating to the handover regions for pairs of cell IDs.

There are particular advantages to this method. First of all the predicted location is read directly from the database for any pair of cell IDs. It is thus possible to predict the direction of travel for a particular location (e.g. going from cell 34572 to cell 24643 is likely to handover in a slightly different location compared with going from cell 24643 to 34572).

When a terminal is first switched on there is usually no cell handover. Under these circumstances only one cell ID is available but with this alternative database all available handover regions involving that cell ID can be used to compute the probable location of the terminal, see FIG. 19. For example, it can be assumed that the cellular terminal 1 location will be bounded by the outside of the handover regions and so the most probable location can be taken as the centroid of all of the possible handover regions. The position of the cellular terminal 1 can be narrowed by also considering the signal power, as described above. If the cellular terminal 1 is close to the typical handover powers then the terminal will be bounded by the handover region. However, if the signal power is higher than the typical handover values then the cellular terminal 1 will more probably be located closer to the centroid.

In the example given a method has been described to predict the time of a handover and also the expected cells or sectors involved in the handover. In the context of the network radio resource management the prediction of the handover can be very useful information. Location assisted handovers can be useful in Time Division Multiple Access (TDMA) system such as GSM and are extremely useful in Code Division Multiple Access (CDMA) based systems involving soft handovers such as in Universal Mobile Telephone System. In particular, soft handovers within the field of 3G technology permit measurements to be taken from several adjacent cells before a full handover event has occurred.

The described method provides several advantages over those methods described in the prior art. For example, the method provides an infrastructure to support location-based pull services and location-based push services. These advantages are illustrated by the following examples:

Location Based Pull Service

A user finds themselves in an unfamiliar town. This user requests a local map and a list of restaurants in the surrounding area via their cellular terminal 1. Typically it is the terminal user that will pay for receiving this information via a pull service.

Location Based Push Service

A subscriber has agreed to accept a tourist information service while on holiday. The local tourist information network service provider is able to detect the location of this subscribing cellular terminal 1. They are then able to push information to this subscriber which is relevant to their current location. This may include maps and visitor attraction details for the immediate area. It might also contain targeted advertisements for local hotels, restaurants and pubs in the vicinity or guide users towards services such as taxi ranks or wireless access points. This service push might be paid for entirely by the advertisers and/or service providers so that the service might even be provided free to the subscriber.

The location techniques described in this invention enable push services to become commercially viable since cellular terminals 1 can be continuously and accurately tracked at relatively low cost. The providers of push services can therefore afford to provide well-targeted information to subscribing cellular terminals 1.

It is important with the provision of push services that the content is contextual and carefully targeted in terms of the user's profile, their specific requests and also their local movements. Using the techniques described it is possible to provide contextual content, for example using the speed estimate of a terminal and its location history. Using this knowledge it is possible to determine if a terminal is speeding through a town centre (e.g. on a high speed train) or if they dwell in a local area for a period of time. It would be pointless and irritating to offer a local pub guide to a 'good-beer subscriber' who has just by-passed a town at 70 mph without stopping. Whereas, a cellular terminals 1 which is moving slowly in an unfamiliar city centre location at 12 noon might be interested in hearing about a special buffet lunch offer nearby.

Similarly local traffic information could be provided automatically. For example, relevant information is sent if the cellular terminal 1 appears to be travelling on a particular route towards some known congestion.

Further advantages of the present invention include the fact that it provides a more accurate method for locating a cellular terminal than the "cell of origin" method described in the prior art. The known latency of the "cell of origin" method is also significantly reduced since the only latency involved with this method relates to the time taken to send the message between the terminal and the server. The accuracy of the method can be further increased by considering the power and timing advance signals transmitted by the base stations and the history of the transmitted signals.

With this invention is it possible to make reliable estimates of the terminal speed and hence to determine if it is on a vehicle travelling along a road, railway or other well defined route. In this way it is possible to find the location on a probable route and to continually update the position according to the terminals estimated speed. There are error feedback mechanisms that can be used to continually validate and correct the location estimate if the speed, or route, change. These provisions again increase the accuracy of the method.

The implementation of this method involves the execution of a software application on the cellular terminal or the network server. However, it should be noted that there are no hardware/firmware alterations required to standard terminals or to the network equipment in order to achieve this implementation.

The described method is cost effective to operate since the network server is not required to supply the location service and so will charge only for the messaging sent across their network. For very short messages, using GPRS for example, the costs will be low and so it is cost effective to constantly track the location of many terminals. The cost of any location request to the operator only needs to be paid for once per cell or sector. When a cell is revisited by any terminal there is no additional requirement from the network operator since a location request is not necessary.

A further advantage of the present method is that it provides a means to verify that the information contained in the database is up-to-date. The location information provided by other commercial location services can be used to check for changes to the network while unexpected behaviour such as sudden jumps in location can also be used to indicate changes in the network or errors in the database.

The universal nature of the invention means that it can be applied to $2^{nd}$ generation and $3^{rd}$ generation cellular equipment or indeed any other communications network where handovers might take place. The particular air interface used is not important for the implementation of this invention.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A method of locating a cellular terminal comprising the steps of:
    detecting a handover event of the cellular terminal from a first network signal transmission region to a second network signal transmission region;
    transmitting to a database from the cellular terminal at least one network signal transmission region identifier associated with the handover event;
    determining whether the handover event exists in the database;
    extracting from the database a location of the handover event if the handover event exists in the database;
    determining whether a reverse handover event of the cellular terminal from the second network signal transmission region to the first network signal transmission region exists in the database;
    extracting the location of the reverse handover event from the database to determine the location of the cellular terminal if the reverse handover event exists in the database;
    determining a location of the first network signal transmission region and the second network signal transmission region to determine the location of the cellular terminal if the reverse handover event does not exist in the database;
    extracting information relating to at least one of location and geometry of the first and second network signal transmission regions based on transmitting a request from the database to a network provider for information corresponding to at least one of the first and second network signal transmission regions;
    calculating a handover region between the first and second network signal transmission regions and the centre of the handover region based on the at least one of location and geometry information so as to provide an estimate of the location of the handover event; and
    expanding an area of the handover region by an amount based on comparing a signal power before and after the handover event with hose obtained in connection with earlier handover events recorded on the database between the first and second network signal transmission regions so as to compensate for effects of shadowing within at least one of the first and second identified regions.

2. A method of locating a cellular terminal as claimed in claim 1 comprising recording a time at which the handover event occurs.

3. A method of locating a cellular terminal as claimed in claim 1 comprising recording a time at which the handover event occurs, wherein the time at which the handover event occurs is forwarded by the cellular terminal to the database.

4. A method of locating a cellular terminal as claimed in claim 1 comprising recording the time of at least two handover events of the cellular terminal, so as to produce a time series of location data for the at least two handover events.

5. A method of locating a cellular terminal as claimed in claim 1 comprising monitoring at least one of a time of flight of the transmitted signals within the first and second identified region and timing synchronisation calculations of the transmitted signals within the first and second network signal transmission regions so as to ascertain any direction of movement associated with the cellular terminal.

6. A method of locating a cellular terminal as claimed in claim 1 comprising recording the location of handover events to allow the database to calculate higher order handover events.

7. A method of locating a cellular terminal as claimed in claim 1 wherein accuracy of the estimate of the location of the cellular terminal is increased by employing knowledge of at least one handover event stored within the database between at least one of the first and second identified regions and a third identified region.

8. A method of locating a cellular terminal as claimed in claim 1 wherein the accuracy of the estimate of the location of the cellular terminal is increased by employing knowledge of local geography stored within the database.

9. A method of providing a cellular terminal user with location-related information comprising locating a cellular terminal in accordance with the method of claim 1; and transmitting to the terminal user specific information relating to its location.

10. A method as claimed in claim 9 wherein the user specific information is determined by a provider of the database in relation to topics pre-supplied to the provider by the user of the cellular terminal.

11. A method as claimed in claim 9 wherein the user specific information transmitted is determined in response to specific requests made by the user of the cellular terminal to the provider of the data base.

12. A method of locating a cellular terminal comprising the steps of:
   detecting a handover event of the cellular terminal from a first network signal transmission region to a second network signal transmission region;
   extracting from a database a location of the handover event, wherein the cellular terminal periodically transmits network signal transmission region identifier information to the database so as to identify the first and second network signal transmission regions so allowing the database to determine when the handover event occurs; and
   translating a handover region associated with the first and second network signal transmission regions relative to at least one of an area of overlap and a distance between the first and second identified regions by an amount dependent on at least one of a time of flight of the transmitted signals within the first and second identified regions and timing synchronisation of the transmitted signals within the first and second identified regions;
   expanding an area of the handover region so as to compensate for effects of shadowing within at least one of the first and second network signal transmission regions; and calculating the area that the handover region has expanded by comparing a signal power before and after the handover event with those obtained in connection with earlier handover events recorded on the database between the identified network signal transmission region and the second network signal transmission region.

13. A method of collating data of network signal transmission regions of at least one cellular communications network, the method comprising:
   providing a cellular terminal;
   requesting from a location service provider, cellular terminal location information corresponding to the terminal;
   having the cellular terminal location information sent to a server;
   sending to a server the network signal transmission region identifier for the region within which the cellular terminal is located;
   computing a location of the identified network signal transmission region from the cellular terminal location information;
   storing, in a database maintained by said server, the computed location of the identified network signal transmission region;
   expanding an area of a handover region between the identified network signal transmission region and a second network signal transmission region so as to compensate for effects of shadowing within at least one of the identified network signal transmission region and the second network signal transmission region; and
   calculating the area of the handover region that has expanded by comparing a signal power before and after a handover event with those obtained in connection with earlier handover events recorded on the database between the identified network signal transmission region and the second network signal transmission region.

14. A method of collating data as claimed in claim 13 wherein the request for cellular terminal location information is made to a Global Positioning Satellite terminal.

15. A method of collating data as claimed in claim 13 wherein the step of sending to a server comprises forwarding the information to a server located within the cellular terminal.

* * * * *